United States Patent
Zhu et al.

(10) Patent No.: US 12,003,322 B2
(45) Date of Patent: Jun. 4, 2024

(54) DATA TRANSMISSION METHOD AND COMMUNICATION APPARATUS

(71) Applicant: HUAWEI TECHNOLOGIES CO., LTD., Guangdong (CN)

(72) Inventors: Huiying Zhu, Shanghai (CN); Pengpeng Dong, Shanghai (CN); Zhiyuan Tan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/939,177

(22) Filed: Sep. 7, 2022

(65) Prior Publication Data

US 2022/0416939 A1    Dec. 29, 2022

Related U.S. Application Data

(63) Continuation of application No. PCT/CN2021/079734, filed on Mar. 9, 2021.

(30) Foreign Application Priority Data

Mar. 9, 2020    (CN) .......................... 202010158630.7

(51) Int. Cl.
*H04L 1/00*  (2006.01)
*H04L 69/324*  (2022.01)

(52) U.S. Cl.
CPC .......... *H04L 1/0042* (2013.01); *H04L 69/324* (2013.01); *H04L 1/0075* (2013.01); *H04L 1/0076* (2013.01); *H04L 1/0078* (2013.01)

(58) Field of Classification Search
CPC ... H04L 1/0041; H04L 1/0042; H04L 69/322; H04L 69/324; H04L 1/00; H04L 1/0006;
(Continued)

(56) References Cited

U.S. PATENT DOCUMENTS

2002/0153549 A1* 10/2002 Laibowitz ......... H01L 21/28194
                                                257/E21.345
2008/0320375 A1* 12/2008 Hori ...................... H04L 1/0061
                                                714/E11.032

(Continued)

FOREIGN PATENT DOCUMENTS

CN       102438207 A    5/2012
WO    2007045141 A1    4/2007
(Continued)

OTHER PUBLICATIONS

Extended European Search Report for Application No. 21768287 dated Jun. 9, 2023, 11 pages.

(Continued)

*Primary Examiner* — Warner Wong

(57) ABSTRACT

This application describes a data transmission method and a communication apparatus. An example data transmission method includes: performing network coding based on a first data segment, to obtain a first network coded data segment; generating first cyclic redundancy check CRC information and a first data unit based on the first network coded data segment, where the first data unit includes a network coding parameter and the first CRC information that correspond to the first network coded data segment, and the first CRC information is for checking the first network coded data segment; and outputting the first data unit. According to of the example method and communication apparatus of this application, a waste of spectrum resources may be avoided, and spectrum efficiency may be improved.

9 Claims, 13 Drawing Sheets

(58) Field of Classification Search
CPC ..... H04L 1/0007; H04L 1/0009; H04L 1/004; H04L 1/0075; H04L 1/0076; H04L 1/0078; H04L 2209/34
See application file for complete search history.

(56) References Cited

U.S. PATENT DOCUMENTS

| | | | |
|---|---|---|---|
| 2009/0199066 A1* | 8/2009 | Kim | H04L 1/0083 714/752 |
| 2009/0201899 A1* | 8/2009 | Liu | H04W 40/02 370/338 |
| 2012/0117446 A1 | 5/2012 | Taghavi Nasrabadi et al. | |
| 2015/0095739 A1* | 4/2015 | Zhovnirnovsky | H03M 13/6502 714/776 |
| 2017/0188203 A1* | 6/2017 | Goseling | H04W 4/06 |
| 2017/0195082 A1* | 7/2017 | Roh | H03M 13/27 |
| 2017/0207880 A1* | 7/2017 | Sun | H04L 1/0061 |
| 2017/0279560 A1 | 9/2017 | Murakami et al. | |
| 2019/0173615 A1* | 6/2019 | Andersson | H04W 72/23 |
| 2019/0181980 A1* | 6/2019 | Lou | H04L 1/0058 |
| 2019/0245561 A1 | 8/2019 | Hwang | |
| 2020/0007163 A1* | 1/2020 | Huangfu | H04L 1/00 |
| 2020/0007164 A1* | 1/2020 | Zhou | H04L 1/0043 |
| 2020/0021392 A1* | 1/2020 | Xu | H03M 13/618 |
| 2020/0145023 A1* | 5/2020 | Qiao | H04L 1/00 |
| 2020/0235847 A1* | 7/2020 | Wang | H04L 1/0057 |
| 2020/0351014 A1* | 11/2020 | Takeda | H04L 1/0045 |
| 2020/0366409 A1* | 11/2020 | Xu | H04L 1/0041 |
| 2021/0176739 A1* | 6/2021 | Hui | H04L 1/0061 |
| 2021/0250904 A1* | 8/2021 | Liu | H04L 1/1812 |
| 2022/0123871 A1 | 4/2022 | Kimura | |
| 2022/0173834 A1* | 6/2022 | Vidal | H04L 1/0041 |
| 2023/0422093 A1* | 12/2023 | Hupp | H04L 69/22 |

FOREIGN PATENT DOCUMENTS

| | | |
|---|---|---|
| WO | 2007051425 A1 | 5/2007 |
| WO | 2019160863 A1 | 8/2019 |
| WO | 2020166230 A1 | 8/2020 |

OTHER PUBLICATIONS

Intel Corporation, AT&T, Use cases and options for network coding in IAB. 3GPP TSG RAN Meeting #86, Sitges, Spain, Dec. 9-12, 2019, RP-192535, 8 pages.
3GPP TR 38.885 V16.0.0 (Mar. 2019), 3rd Generation Partnership Project; Technical Specification Group Radio Access Network; NR; Study on NR Vehicle-to-Everything (V2X)(Release 16), 122 pages.
International Search Report and Written Opinion issued in PCT/CN2021/079734, dated May 28, 2021, 10 pages.

* cited by examiner

| Protocol header part | Network coded data part | CRC |

| Protocol header part | Subheader part 1 | Network coded data part 1 | CRC 1 | Subheader part 2 | Network coded data part 2 | CRC 2 |

| Protocol header part | Subheader part 1 | Subheader part 2 | Network coded data part 1 | CRC 1 | Network coded data part 2 | CRC 2 |

| Protocol header part | Subheader part 1 | Network coded data part 1 | Subheader part 2 | Network coded data part 2 |

| Protocol header part | Subheader part 1 | Subheader part 2 | Network coded data part 1 | Network coded data part 2 |

DATA TRANSMISSION METHOD AND COMMUNICATION APPARATUS

CROSS-REFERENCE TO RELATED APPLICATIONS

This application is a continuation of International Application No. PCT/CN2021/079734, filed on Mar. 9, 2021, which claims priority to Chinese Patent Application No. 202010158630.7, filed on Mar. 9, 2020. The disclosures of the aforementioned applications are hereby incorporated by reference in their entireties.

TECHNICAL FIELD

This disclosure relates to the field of communication technologies, and in particular, to a data transmission method and a communication apparatus.

BACKGROUND

To ensure service reliability, a feedback-based request retransmission mechanism is introduced, for example, a hybrid automatic repeat request (HARQ) mechanism at a media access control (MAC) layer. A HARQ protocol exists on both a transmit end and a receive end. A MAC layer of the transmit end determines a size of a transport block (TB), and then notifies a radio link control (RLC) layer. The RLC layer segments a service data unit (RLC SDU) based on the determined size of the TB to generate an RLC PDU. The MAC layer concatenates the RLC PDU sent by the RLC layer to generate a TB, and sends the TB to a physical (PHY) layer for processing. After adding cyclic redundancy check (CRC) information to the received TB, the PHY layer performs code block segmentation to obtain a plurality of code blocks (CBs), and adds CRC information to each CB. Then, after performing channel coding and rate matching on each CB, the PHY layer performs operations such as code block concatenation, scrambling, modulation, and resource mapping on the CB, and then sends the CB to the receive end. Provided that the receive end finds that a CRC check error corresponding to one of the CB s included in the received TB occurs, the receive end sends feedback information to request the transmit end to retransmit the entire TB, and the entire TB is not delivered to the RLC layer until a MAC entity of the receive end determines that the entire TB is correctly decoded. A MAC entity of the transmit end retransmits the entire TB to the receive end when only a part of bits or only a part of CB s in the TB are incorrectly transmitted. Consequently, spectrum resources are wasted.

SUMMARY

Embodiments of this application provide a data transmission method and a communication apparatus, to avoid a waste of spectrum resources and improve spectrum efficiency.

According to a first aspect, an embodiment of this application provides a communication method. The method may be performed by a first device, or may be performed by a component (for example, a processor, a chip, or a chip system) of the first device. The first device may be a network device or a terminal device, or may be another device or network element in a communication system. The communication method may include: The first device performs network coding based on a first data segment, to obtain a first network coded data segment; generates first CRC information and a first data unit based on the first network coded data segment, where the first data unit includes a network coding parameter and the first CRC information that correspond to the first network coded data segment, and the first CRC information is for checking the first network coded data segment; and further outputs the generated first data unit.

According to embodiments of this application, the first device performs network coding on a data segment, to generate a network coded data segment; and adds CRC information to the network coded data segment, so that a second device at a receive end checks the network coded data segment by using the CRC information, to determine whether the network coded data segment is correctly transmitted; and decodes a correctly transmitted network coded data segment, to obtain the data segment used for network coding. In this manner, an entire TB does not need to be retransmitted when a transmission error occurs on an individual CB or a bit transmission error occurs, so that a waste of spectrum resources may be avoided, and spectrum efficiency may be improved.

Optionally, a network coding scheme may include but is not limited to one of the following schemes: random linear network coding, deterministic linear network coding, BATS code, erasure code, fountain code, convolutional network coding, streaming coding, or the like.

For example, the network coding may be performed on M first data segments, to obtain N first network coded data segments. The M first data segments may belong to a same group of code block, and a value of N may be greater than or equal to a value of M.

The first data segment may include a first original data segment, or the first data segment may include a first original data segment and second CRC information. The second CRC information is obtained through calculation based on the first original data segment, and the second CRC information is for checking the first original data segment. One first data segment may include one first original data segment and one piece of second CRC information corresponding to the first original data segment.

Through implementation of this embodiment, the second CRC information is added to the first original data segment, so that reliability of transmission of an original data segment may be further improved.

Optionally, first CRC information corresponding to the first network coded data segment is generated for each first network coded data segment in the N first network coded data segments, that is, one first network coded data segment corresponds to one piece of first CRC information.

In a possible implementation, the first CRC information may be obtained through calculation based on the first network coded data segment, in other words, the first CRC information covers the first network coded data segment, and the first CRC information is for checking the first network coded data segment. Alternatively, the first CRC information may be obtained through calculation based on the first network coded data segment and the network coding parameter corresponding to the first network coded data segment, in other words, the first network coded data segment and the corresponding network coding parameter are added to the first CRC information as a whole. In this case, the first CRC information covers the first network coded data segment and the network coding parameter corresponding to the first network coded data segment, and the first CRC information is for checking the first network coded data segment and the network coding parameter corresponding to the first network coded data segment.

Through implementation of this embodiment, the first CRC information may be generated based on the first network coded data segment and the network coding parameter, in other words, the first network coded data segment and the network coding parameter may be checked by using the first CRC information, to check accuracy of transmission of the first network coded data segment and the network coding parameter.

In a possible implementation, the first data unit may be a PDU, and the PDU includes a protocol header part, a network coded data part, and a check bit part.

The protocol header part includes the network coding parameter, the network coded data part includes the first network coded data segment, and the check bit part includes the first CRC information.

For example, the network coded data part may include one or more first network coded data segments. Correspondingly, the protocol header part may include a network coding parameter corresponding to the one or more first network coded data segments, and the check bit part includes first CRC information corresponding to the one or more first network coded data segments.

Through implementation of this embodiment, the protocol header part carries the network coding parameter, the network coded data part carries the first network coded data segment, the check bit part carries the first CRC information, so that there is no additional indication information and overheads are reduced.

In a possible implementation, the first data unit may be a PDU, and the PDU includes a protocol header part, at least one network coded data part, at least one subheader part, and at least one check bit part.

The protocol header part includes quantity indication information, and the quantity indication information indicates a quantity of first network coded data segments included in the PDU. One network coded data part includes one first network coded data segment, one subheader part includes a network coding parameter corresponding to the first network coded data segment, and one check bit part includes one piece of first CRC information corresponding to the first network coded data segment.

Through implementation of this embodiment, the first network coded data segments each are carried by using different network coded data parts, the corresponding network coding parameters are carried by using different subheader parts, and the corresponding first CRC information is carried by using different check bit parts. This facilitates obtaining of each piece of information through parsing by the receive end.

In a possible implementation, the first data unit may be a PDU, and the PDU includes a protocol header part, a data field part, and a check bit part.

The protocol header part includes length indication information, and the length indication information indicates a length of the data field part.

The data field part includes the network coding parameter and the first network coded data segment, and the check bit part includes the first CRC information. Optionally, the data field part may include one or more first network coded data segments and one or more network coding parameters respectively corresponding to the one or more first network coded data segments, and the check bit part includes first CRC information respectively corresponding to the one or more first network coded data segments.

Through implementation of this embodiment, the network coding parameter and the first network coded data segment are carried by the data field part, and the first CRC information is carried by the check bit part. This facilitates obtaining of each piece of information through parsing by the receive end when complexity of a PDU format design is reduced.

In a possible implementation, the first data unit may be a PDU, and the PDU includes a protocol header part and a data field part.

The protocol header part includes length indication information, and the length indication information indicates a length of the data field part. The data field part includes the network coding parameter, the first network coded data segment, and the first CRC information. Optionally, the data field part may include one or more first network coded data segments, one or more network coding parameters respectively corresponding to the one or more first network coded data segments, and first CRC information respectively corresponding to the one or more first network coded data segments.

Through implementation of this embodiment, the network coding parameter, the first network coded data segment, and the first CRC information are carried by the data field part, to reduce complexity of a PDU format design.

In embodiments of this application, one of the plurality of types of PDUs may be used to carry the first network coded data segment, the network coding parameter, and the first CRC information. The PDU may be a PDU of another protocol layer other than a physical layer. The another protocol layer other than the physical layer may be one of the following: a MAC layer, an RLC layer, a backhaul adaptation protocol (BAP) layer, a packet data convergence protocol (PDCP) layer, or another protocol layer having a network coding function. The protocol layer having the network coding function may be a new protocol layer other than the MAC layer, the RLC layer, the BAP layer, and the PDCP layer. The protocol layer may be referred to as a network coding layer. The protocol layer may be located above the PDCP layer, or located above the BAP layer, or located between the PDCP layer and the RLC layer, or located between the RLC layer and the MAC layer, or located between the MAC layer and the physical layer. This is not specifically limited in embodiments of this application.

In another possible implementation, the first data unit may alternatively be a physical layer TB or a physical layer CB. For example, if the first data unit is the physical layer CB, the first data unit includes a code block header, a code block, and a check bit part, and the code block includes at least one first network coded data segment.

The check bit part includes the first CRC information corresponding to the code block.

The code block header includes one or more network coding parameters respectively corresponding to one or more first network coded data segments in the at least one first network coded data segment that is included in the code block.

Through implementation of this embodiment, the CB carries the first network coded data segment, and CRC information corresponding to the CB is used as the first CRC information corresponding to the first network coded data segment carried by the CB, so that an existing CB design can be compatible.

In a possible implementation, first CRC information corresponding to a code block CB may be generated based on at least one first network coded data segment included in the code block, in other words, the first CRC information is for checking the at least one first network coded data segment included in the code block.

Alternatively, first CRC information corresponding to a code block CB may be generated based on at least one first network coded data segment included in the code block and data included in a code block header that is added, in other words, the first CRC information is for checking the at least one first network coded data segment included in the code block and the data included in the code block header.

Through implementation of this embodiment, the first CRC information corresponding to the code block may be generated in a plurality of manners. This facilitates checking of the first network coded data segment included in the code block and/or the data included in the code block header.

In a possible implementation, the network coding parameter may include one or more of the following parameters: identifier information of a code block corresponding to the first network coded data segment, coefficient indication information corresponding to the first network coded data segment, identifier information of the first network coded data segment in the corresponding code block, a quantity of first data segments included in the code block corresponding to the first network coded data segment, size or length information of the first data segment, or the like.

In a possible implementation, the PDU in embodiments of this application is one of the following plurality of types of PDUs: a MAC layer PDU, a RLC layer PDU, a BAP layer PDU, a PDCP layer PDU, a PDU of a protocol layer having a network coding function, or the like.

According to a second aspect, an embodiment of this application provides a communication method. The method may be performed by a second device, or may be performed by a component (for example, a processor, a chip, or a chip system) of the second device. The second device may be a network device or a terminal device, or may be another device or network element in a communication system. The communication method may include: obtaining a second data unit, where the second data unit includes a second network coded data segment, a network coding parameter corresponding to the second network coded data segment, and third CRC information; checking the second network coded data segment by using the third CRC information, and determining, based on a check result, that the second network coded data segment is correctly transmitted; and further decoding the second network coded data segment based on the network coding parameter.

According to embodiments of this application, the second device at a receive end checks a network coded data segment by using CRC information, to determine whether the network coded data segment is correctly transmitted; and decodes a correctly transmitted network coded data segment, to obtain a data segment used for network coding. In this manner, an entire TB does not need to be retransmitted when a transmission error occurs on an individual CB or a bit transmission error occurs, so that a waste of spectrum resources may be avoided, and spectrum efficiency may be improved.

Optionally, a type of the second data unit in the communication method provided in the second aspect is the same as a type of the first data unit in the communication method provided in the first aspect. For example, if the first data unit is an RLC layer PDU, the second data unit is also an RLC layer PDU.

In a radio channel environment, the second data unit and the first data unit may be different or the same due to factors such as fading caused by channel noise or mobility or interference caused by other users. The second network coded data segment in the second data unit may be the same as or different from the first network coded data segment in the first data unit. If the second network coded data segment is different from the first network coded data segment, it indicates that the second network coded data segment is incorrectly transmitted. If the second network coded data segment is the same as the first network coded data segment, it indicates that the second network coded data segment is correctly transmitted.

In a possible implementation, the third CRC information corresponding to the second network coded data segment may cover the second network coded data segment, or the third CRC information may cover the second network coded data segment and the network coding parameter corresponding to the second network coded data segment.

If the third CRC information covers the second network coded data segment and the network coding parameter corresponding to the second network coded data segment, the third CRC information is used to check the second network coded data segment and the network coding parameter corresponding to the second network coded data segment, to obtain a check result. The check result indicates whether the second network coded data segment and the corresponding network coding parameter are correctly transmitted. If the second network coded data segment and the network coding parameter are correctly transmitted, the second network coded data segment is decoded based on the network coding parameter.

Through implementation of this embodiment, the third CRC information may be used to check the second network coded data segment and the corresponding network coding parameter, to check accuracy of transmission of the network coded data segment and the network coding parameter.

In a possible implementation, if a first data segment on which a first device performs network coding includes a first original data segment and second CRC information, correspondingly, a second data segment obtained by the second device by decoding the second network coded data segment based on the network coding parameter includes a second original data segment and fourth CRC information.

Further, the second original data segment is checked by using the fourth CRC information, and whether the second original data segment is correctly transmitted is determined based on a check result. The second device uses a correctly transmitted second original data segment as a to-be-obtained original data segment.

Through implementation of this embodiment, the second original data segment is checked by using the fourth CRC information, and whether the second original data segment is correctly transmitted is determined based on the check result, so that reliability of transmission of an original data segment may be further improved.

According to a third aspect, an embodiment of this application provides a communication method. The method may be performed by a first device, or may be performed by a component (for example, a processor, a chip, or a chip system) of the first device. The first device may be a network device or a terminal device, or may be another device or network element in a communication system. The communication method may include: generating fifth CRC information based on a third original data segment; performing network coding based on the third original data segment and the fifth CRC information, to obtain a third network coded data segment; and further generating a third data unit based on the third network coded data segment, where the third data unit includes a network coding parameter corresponding to the third network coded data segment.

According to embodiments of this application, CRC information is added to an original data segment, and the network coding is performed based on the original data segment and the corresponding CRC information, to obtain a network coded data segment, so that reliability of transmission of the original data segment may be improved, and spectral efficiency may be further improved.

Optionally, the fifth CRC information corresponding to the third original data segment may be generated for each third original data segment, that is, one third original data segment corresponds to one piece of fifth CRC information, and the fifth CRC information is added to the third original data segment.

Further, the network coding may be performed on M third original data segments to which the fifth CRC information is added and that belong to a same group of code block, to obtain N third network coded data segments.

It may be understood that the N third network coded data segments may be distributed in one or more third data units. This is not limited in embodiments of this application.

Optionally, the third data unit in embodiments of this application may be a physical layer TB or a physical layer CB, or may be a PDU of another protocol layer other than a physical layer. The another protocol layer may be one of the following: a MAC layer, an RLC layer, a BAP layer, a PDCP layer, or another protocol layer having a network coding function. The protocol layer having the network coding function may be a new protocol layer other than the MAC layer, the RLC layer, the BAP layer, and the PDCP layer. The protocol layer may be referred to as a network coding layer. The protocol layer may be located above the PDCP layer, or located above the BAP layer, or located between the PDCP layer and the RLC layer, or located between the RLC layer and the MAC layer, or located between the MAC layer and the physical layer. This is not specifically limited in embodiments of this application.

In a possible implementation, the third data unit is a PDU, and the PDU includes a protocol header part and a network coded data part.

The protocol header part includes the network coding parameter, and the network coded data part includes the third network coded data segment.

For example, the network coded data part may include one or more third network coded data segments.

Through implementation of this embodiment, the protocol header part carries the network coding parameter, the network coded data part carries the third network coded data segment, so that there is no additional indication information and overheads are reduced.

In a possible implementation, the third data unit is a PDU, and the PDU includes a protocol header part, at least one network coded data part, and at least one subheader part.

The protocol header part includes quantity indication information, and the quantity indication information indicates a quantity of third network coded data segments included in the PDU. One network coded data part includes one third network coded data segment, and one subheader part includes a network coding parameter corresponding to the third network coded data segment.

Through implementation of this embodiment, the third network coded data segments each are carried by using different network coded data parts, and the corresponding network coding parameters are carried by using different subheader parts. This facilitates obtaining of each piece of information through parsing by a receive end.

In a possible implementation, the third data unit is a PDU, and the PDU includes a protocol header part and a data field part.

The protocol header part includes length indication information, and the length indication information indicates a length of the data field part. The data field part includes the third network coded data segment and the network coding parameter. Optionally, the data field part may include one or more third network coded data segments and one or more network coding parameters respectively corresponding to the one or more third network coded data segments.

Through implementation of this embodiment, the network coding parameter and the third network coded data segment are carried by the data field part, to reduce complexity of a PDU format design.

According to a fourth aspect, an embodiment of this application provides a communication method. The method may be performed by a second device, or may be performed by a component (for example, a processor, a chip, or a chip system) of the second device. The second device may be a network device or a terminal device, or may be another device or network element in a communication system. The communication method may include: obtaining a fourth data unit, where the fourth data unit includes a fourth network coded data segment and a network coding parameter corresponding to the fourth network coded data segment; decoding the fourth network coded data segment based on the network coding parameter, to obtain a fourth original data segment and sixth CRC information; and further checking the fourth original data segment by using the sixth CRC information, and determining, based on a check result, whether the fourth original data segment is correctly transmitted.

Optionally, a type of the fourth data unit in the communication method provided in the fourth aspect is the same as a type of the third data unit in the communication method provided in the third aspect. For example, if the third data unit is an RLC layer PDU, the fourth data unit is also an RLC layer PDU.

In a radio channel environment, the fourth data unit and the third data unit may be different or the same due to factors such as fading caused by channel noise or mobility or interference caused by other users. The fourth network coded data segment in the fourth data unit may be the same as or different from the third network coded data segment in the third data unit.

According to embodiments of this application, after decoding a network coded data segment, the second device at a receive end checks an original data segment by using CRC information obtained through decoding, to improve reliability of transmission of the original data segment. In this manner, an entire TB does not need to be retransmitted when a transmission error occurs on an individual CB or a bit transmission error occurs, so that a waste of spectrum resources may be avoided, and spectrum efficiency may be improved.

According to a fifth aspect, an embodiment of this application provides a communication apparatus, including modules or units configured to perform the method according to any one of the first aspect to the fourth aspect.

According to a sixth aspect, an embodiment of this application provides a communication apparatus, including a processor. The processor is coupled to a memory, and may be configured to execute instructions in the memory, to implement the method according to any one of the first aspect to the fourth aspect. Optionally, the communication apparatus further includes a memory. Optionally, the communication apparatus further includes a communication interface, and the processor is coupled to the communication interface.

According to a seventh aspect, an embodiment of this application provides a processor, including an input circuit, an output circuit, and a processing circuit. The processing circuit is configured to receive a signal through the input circuit, and transmit a signal through the output circuit, so that the processor is enabled to perform the method according to any one of the first aspect to the fourth aspect.

In a specific implementation process, the processor may be one or more chips, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

According to an eighth aspect, an embodiment of this application provides a processing apparatus, including a processor and a memory. The processor is configured to read instructions stored in the memory, receive a signal through a receiver, and transmit a signal through a transmitter, to perform the method according to any one of the first aspect to the fourth aspect.

Optionally, there are one or more processors, and there are one or more memories.

Optionally, the memory may be integrated with the processor, or the memory and the processor are separately disposed.

In a specific implementation process, the memory may be a non-transitory memory, such as a read-only memory (ROM). The memory and the processor may be integrated on a same chip, or may be separately disposed on different chips. A type of the memory and a manner of disposing the memory and the processor are not limited in embodiments of this application.

It should be understood that a related data exchange process, for example, sending a request message, may be a process of outputting the request message from the processor, and for example, receiving a message may be a process of receiving the message by the processor. Specifically, data output by the processor may be output to the transmitter, and input data received by the processor may be from the receiver. The transmitter and the receiver may be collectively referred to as a transceiver.

The processing apparatus in the eighth aspect may be one or more chips. The processor in the processing apparatus may be implemented by using hardware, or may be implemented by using software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may be located outside the processor and exist independently.

According to a ninth aspect, an embodiment of this application provides a computer program product. The computer program product includes a computer program (which may also be referred to as code or instructions). When the computer program is run, a computer is enabled to perform the method according to any one of the first aspect to the fourth aspect.

According to a tenth aspect, an embodiment of this application provides a computer-readable storage medium. The computer-readable storage medium includes a computer program (which may also be referred to as code or instructions). When the computer program is run on a computer, the computer is enabled to perform the method according to any one of the first aspect to the fourth aspect.

According to an eleventh aspect, an embodiment of this application provides a communication system, including the foregoing first device and/or second device.

According to a twelfth aspect, a chip system is provided. The chip system includes a processor and an interface. The processor is configured to invoke, from a memory, a computer program (which may also be referred to as code or instructions) stored in the memory and run the computer program, to implement a function in any one of the first aspect to the fourth aspect. In a possible design, the chip system further includes a memory, and the memory is configured to store necessary program instructions and necessary data. The chip system may include a chip, or may include a chip and another discrete component.

DESCRIPTION OF EMBODIMENTS

Before embodiments of this application are described, the following first describes names or terms in embodiments of this application.

1. Network Coding

A network coding scheme that may be used for network coding in embodiments of this application includes but is not limited to: random linear network coding (RLNC), deterministic linear network coding, batch sparse code (BATS), erasure code, fountain code, and the like.

The following uses the RLNC network coding as an example to describe the network coding in embodiments of this application.

Figures 1A, 1B:
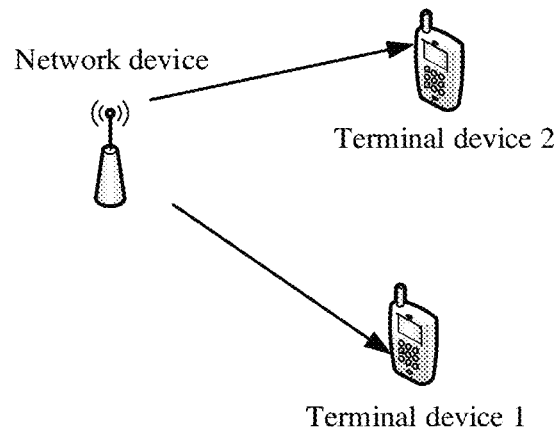
FIG. 1a is a schematic diagram of network coding according to an embodiment of this application.
FIG. 1b is a diagram of a system architecture according to an embodiment of this application.

As shown in FIG. 1a, a transmit end divides to-be-sent original data packets into a plurality of groups of RLNC code block, where one group of RLNC code block includes M original data packets, which are respectively represented as $X_1, X_2, \ldots X_M$. Linear combination may be performed on the M original data packets, to generate N (N≥M) coded data packets, where the linear combination satisfies a formula $Y_i = \sum_{m=1}^{M} g_{i,m} \times X_m$, the N coded data packets are represented as $Y_1, Y_2, \ldots, Y_N$, where $Y_i$ represents an $i^{th}$ coded data packet, $X_m$ represents an $m^{th}$ original data packet, $g_{i,m}$ represents a random coefficient of the $m^{th}$ original data packet in the $i^{th}$ coded data packet, and $g_{i,m}$ is randomly selected from a finite field or a GF (Galois field). The GF field is a field including a finite quantity of elements, and GF(q) may be used to represent a GF field including q elements. For example, GF(q) represents $\{0, 1, \ldots, q-1\}$. A size of the GF field may be predefined, or may be configured by a network device. A difference between the deterministic linear network coding and the random linear network coding is that a coefficient used for the deterministic linear network coding is not randomly selected, but is specified or configured by the network device.

Each coded data packet may satisfy the following formula:

$$Y_1 = g_{1,1}X_1 + g_{1,2}X_2 + \ldots + g_{1,M}X_M$$
$$Y_2 = g_{2,1}X_1 + g_{2,2}X_2 + \ldots + g_{2,M}X_M$$
$$\ldots$$
$$Y_N = g_{N,1}X_1 + g_{N,2}X_2 + \ldots + g_{N,M}X_M$$

A network coding parameter corresponding to a coded data packet $Y_i$ includes a coding coefficient vector $[g_{i,1}\ g_{i,2} \ldots g_{i,M}]$ for generating the coded data packet. A length of the coding coefficient vector (or referred to as a dimension of the coding coefficient vector or a quantity of elements in the coding coefficient vector) is the same as the quantity M of the original data packets in a code block. The transmit end sends N (N≥M) coded data packets to a receive end for one group of RLNC code block. If a quantity of coded data packets received by the receive end is greater than or equal to M, and a rank of a matrix including coding coefficient vectors carried in headers of the coded data packets is M, namely, the quantity of original data packets. In other words, if the receive end receives M linearly independent coded data packets, the receive end may obtain the M original data packets through decoding. For example, the receive end may construct a system of linear equations based on the coding coefficient vectors, where the system of linear equations includes M to-be-solved unknown numbers, which are represented as $X_{in}$, m∈{1,2, ... M}, and the M original data packets are obtained through decoding by using a linear equation theory.

If the receive end correctly receives all the N coded data packets $Y_1, Y_2, \ldots, Y_N$, the receive end may also obtain the M original data packets through decoding. For example, a header of a received coded data packet $Y_i$ includes a piece of coefficient indication information indicating a coding coefficient vector of a length M. The receive end combines N received coding coefficient vectors to form a system of linear equations in M variables with respect to unknown numbers $X_1, X_2, \ldots, X_M$. A coefficient matrix of the system of equations is:

$$G = \begin{bmatrix} g_{1,1} & g_{1,2} & \cdots & g_{1,M} \\ g_{2,1} & g_{2,2} & \cdots & g_{2,M} \\ \vdots & \vdots & \ddots & \vdots \\ g_{N,1} & g_{N,2} & \cdots & g_{N,M} \end{bmatrix}$$

A rank of the coefficient matrix is M, and the receive end may obtain the M original data packets through decoding by using the coefficient matrix.

In conclusion, in the RLNC network coding scheme, for a group of code block, if a quantity L of coded data packets correctly received by the receive end is greater than or equal to the quantity M of the original data packets, and a rank of a matrix including coding coefficient vectors carried in headers of the L coded data packets is M, the receive end may obtain the M original data packets through decoding.

2. Cyclic Redundancy Check (CRC)

CRC is an error check code, and is for detecting or checking an error that may occur after data transmission. For example, a sender uses a formula to calculate a value of information included in transmitted data and attaches the value after the transmitted data. A receiver performs same calculation on the same data and shall obtain a same result. If two CRC results are inconsistent, it indicates that an error occurs during transmission.

3. Other Terms in Embodiments of this Application

A data segment in embodiments of this application may be replaced with a data packet, a data block, or the like. For example, a first data segment may be referred to as a first data packet or a first data block, a second data segment may be referred to as a second data packet or a second data block, a first original data segment may be referred to as a first original data packet or a first original data block, and a second original data segment may be referred to as a second original data packet or a second original data block.

A network coded data segment may be replaced with a network coded packet, a coded data packet, a network coded data packet, a network coded data block, a network coded data unit, or the like. For example, a first network coded data segment may be referred to as a first network coded packet, or a first coded data packet, or may be referred to as a first network coded data unit, or the like.

A first device in embodiments of this application may also be referred to as a transmit end device, and a second device may also be referred to as a receive end device.

The first device performs network coding at a protocol layer having a network coding function, to generate a network coded data segment. The protocol layer may be an RLC layer, a packet data convergence protocol (PDCP) layer, a backhaul adaptation protocol (BAP) layer, a MAC layer, or a PHY layer. Alternatively, for example, a network coding layer having a network coding function is added above a PDCP layer, or a network coding layer having a network coding function is added above a BAP layer, or a network coding layer having a network coding function is added between a PDCP layer and an RLC layer, or a network coding layer having a network coding function is added between an RLC layer and a MAC layer, or a network coding layer having a network coding function is added between a MAC layer and a PHY layer. This is not limited in embodiments of this application. For ease of description, the foregoing protocol layers having the network coding function are collectively referred to as the network coding layer throughout this specification.

A data unit in embodiments of this application may be a physical layer TB or a physical layer CB, or may be a protocol data unit (PDU) of another protocol layer other than a physical layer.

The another protocol layer other than the physical layer may be one of the following: a MAC layer, an RLC layer, a BAP layer, a PDCP layer, or another protocol layer having a network coding function. The protocol layer having the network coding function may be a new protocol layer other than the MAC layer, the RLC layer, the BAP layer, and the PDCP layer. The protocol layer may be referred to as a network coding layer. The protocol layer may be located above the PDCP layer, or located above the BAP layer, or located between the PDCP layer and the RLC layer, or located between the RLC layer and the MAC layer, or located between the MAC layer and the physical layer. This is not specifically limited in embodiments of this application.

In embodiments of this application, a code block corresponding to a network coded data segment may be understood as that the network coded data segment is obtained by performing network coding based on an original data segment included in the code block.

In embodiments of this application, that CRC information covers a network coded data segment may be understood as that the CRC information is obtained through calculation based on the network coded data segment. In other words, the CRC information is for checking the network coded data segment. Alternatively, that CRC information covers a network coded data segment and a network coding parameter may be understood as that the CRC information is obtained through calculation based on the network coded data segment and the network coding parameter. In other words, the CRC information is for checking the network coded data segment and the network coding parameter.

In embodiments of this application, a "code block" may alternatively be referred to as a "code group". Correspondingly, each code group may be uniquely identified by using a group identifier (group ID). Alternatively, a "code block" may be referred to as a "code batch". Correspondingly, each network code batch may be uniquely identified by using a batch identifier (batch ID). Alternatively, a "code block" may be referred to as a "code generation". Correspondingly, each network code generation may be uniquely identified by using a generation identifier (generation ID). The "code block", "code group", "code batch", and "code generation" may be replaced with each other.

This application may be applied to protocol frameworks of a plurality of wireless communication systems. The wireless communication system may include but is not limited to a long term evolution (LTE) system, a new radio access technology (NR) system, a future evolved communication system, and the like. The future evolved communication system is, for example, a future network or a 6th generation communication system.

This application may be applied to a plurality of mobile communication scenarios of the foregoing wireless communication systems, for example, point-to-point transmission between a base station and a user equipment (UE) or between UEs, multi-hop/relay transmission between a base station and a user equipment, and dual connectivity (DC) or multi-connectivity between a plurality of base stations and user equipment.

FIG. 1B is a schematic diagram of a system architecture of a communication system according to this application. It may be understood that FIG. 1B is merely an example, and imposes no limitation on a network architecture applicable to this application. In addition, transmission such as uplink transmission, downlink transmission, access link transmission, backhaul (backhaul) link transmission, and sidelink (sidelink) transmission is not limited in this application.

FIG. 1B is a schematic diagram of a network architecture to which embodiments of this application are applied. The network architecture shown in FIG. 1B includes a network device and a terminal device. There may be one or more network devices, and there may be one or more terminal devices.

It may be understood that a quantity and a form of devices shown in FIG. 1B are used as an example, and do not constitute any limitation on embodiments of this application. For example, in an actual application, two or more network devices may be included.

In embodiments of this application, the network device is an apparatus deployed in a radio access network to provide a wireless communication function for the terminal device. The network device may include a macro base station, a micro base station (which is also referred to as a small cell), a relay station, an access point, and the like in various forms. In systems using different radio access technologies, names of the network devices may be different, for example, an eNB or an eNodeB (evolutional NodeB) in LTE (long term evolution). Alternatively, the network device may be a radio controller in a C-RAN (cloud radio access network) scenario. Alternatively, the network device may be a base station device in a 5G network or a network device in a future evolved network. Alternatively, the network device may be a wearable device or a vehicle-mounted device. Alternatively, the network device may be a transmission reception point (TRP). Alternatively, the network device may be an umbrella term for all devices at a network end. For example, when a plurality of TRPs are used to transmit data to the terminal device, the plurality of TRPs are collectively referred to as a network device.

In embodiments of this application, the terminal device is a device having a wireless transceiver function, and may be a device deployed on land, including an indoor device or an outdoor device, a handheld device, a wearable device, or a vehicle-mounted device, may be deployed on water (for example, on a ship), or may be deployed in the air (for example, on an airplane, a balloon, or a satellite). The terminal device may be a mobile phone, a tablet computer (Pad), a computer having a wireless transceiver function, a virtual reality (VR) terminal device, an augmented reality (AR) terminal device, a wireless terminal in industrial control, a vehicle-mounted terminal device, a wireless terminal in self driving, a wireless terminal in telemedicine (remote medical), a wireless terminal in a smart grid, a wireless terminal in transportation safety, a wireless terminal in a smart city, a wireless terminal in a smart home, a wearable terminal device, or the like. An application scenario is not limited in embodiments of this application. The terminal device sometimes may alternatively be referred to as a terminal, a user equipment (UE), an access terminal device, a vehicle-mounted terminal, an industrial control terminal, a UE unit, a UE station, a mobile station, a remote station, a remote terminal device, a mobile device, a UE agent, a UE apparatus, or the like. The terminal device may be fixed or mobile.

A first device and a second device in embodiments of this application have different meanings in different mobile communication scenarios. For example, in a mobile communication scenario of point-to-point transmission between UEs, the first device and the second device may be different terminal devices. For another example, in the network architecture shown in FIG. 1B, the first device may be a terminal device or a network device, and the second device may also be a terminal device or a network device.

A network architecture and a service scenario described in embodiments of this application are intended to describe the technical solutions in embodiments of this application more clearly, and do not constitute any limitation on the technical solutions provided in embodiments of this application. A person of ordinary skill in the art may know that, with evolution of the network architecture and emergence of new service scenarios, the technical solutions provided in embodiments of this application are also applicable to resolving similar technical problems.

The following describes in detail the data transmission method provided in embodiments of this application. In a description process, a name of information exchanged between the first device and the second device is used as an example, and does not constitute any limitation on embodiments of this application.

Figure 2:
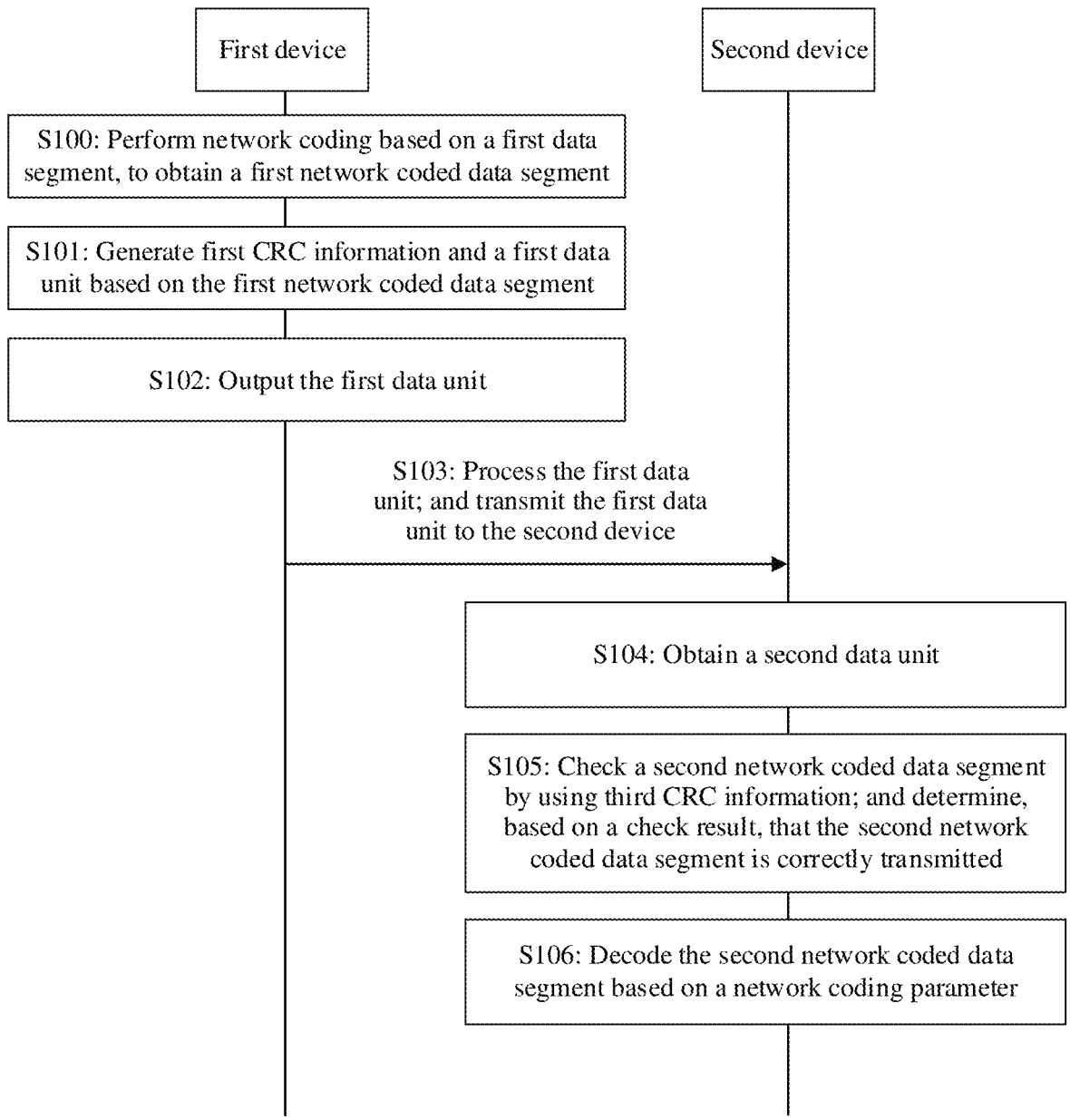
FIG. 2 is a schematic flowchart of a data transmission method according to an embodiment of this application.

FIG. 2 is a schematic flowchart of a data transmission method according to an embodiment of this application. The method may include but is not limited to the following steps.

S100: A first device performs network coding based on a first data segment, to obtain a first network coded data segment.

In an embodiment, the first device may perform network coding on at least one first data segment, to obtain at least one first network coded data segment, where the at least one first data segment may be obtained by segmenting to-be-sent data. The at least one first data segment may be a data segment that belongs to a same group of code block. The first data segment may include a first original data segment, or the first data segment may include a first original data segment and second CRC information. The second CRC information is obtained through calculation based on the first original data segment, and the second CRC information is for checking the first original data segment. One first data segment may include one piece of second CRC information.

Optionally, a protocol layer or a protocol entity having a network coding function divides the to-be-sent data into a plurality of groups of code block, and each group of code block includes at least two first original data segments. Each group of code block may be distinguished by using identifier information, for example, a block ID. The to-be-sent data may be one or more PDUs sent by an upper layer protocol, or may be one or more service data units (SDUs) or SDU segments of a current protocol layer, or may be a physical layer TB or a physical layer CB. This is not limited in embodiments of this application.

The first original data segments in the group of code block may have a same size or different sizes. For example, a network side device may limit or perform semi-persistent configuration on the size (a quantity of bits or a quantity of bytes) of the first original data segment, or may be in a predefined manner. For example, the first device sequentially selects data bits of a size of 1000 bytes once as one first original data segment.

For another example, if the network coding is implemented at a physical layer, one CB may be used as one first original data segment.

For example, a quantity of first original data segments included in one group of code block may be represented as M, where M≥2. The network side device may limit or perform semi-persistent configuration on a value of M, or a value of M may be predefined, for example, M=8. Alternatively, a transmit end may determine a value of M, but needs to notify a receive end of the value of M.

Further, the first device may perform network coding on the M first original data segments, to obtain N first network coded data segments. In this implementation, the first data segment used for the network coding in step S100 includes the first original data segment. Alternatively, the first device may add second CRC information to each first original data segment, in other words, add one piece of second CRC information to one first original data segment, where the second CRC information may be obtained through calculation based on the corresponding first original data segment; and then perform network coding on the M first original data segments to which the second CRC information is added, to obtain N first network coded data segments. In this implementation, the first data segment used for the network coding in step S100 includes the first original data segment and the second CRC information. For ease of description, in embodiments of this application, the first original data segment and the first original data segment to which the second CRC information is added are collectively referred to as the first data segment.

The protocol layer or the protocol entity having the network coding function in the first device performs network coding on the M first data segments, to obtain the N first network coded data segments, where the N first network coded data segments are respectively $Y_1, Y_2, \ldots, Y_N$ (N≥1). It may be understood that a network coding scheme used for the network coding in embodiments of this application is predefined or configured in a semi-persistent manner. The network coding scheme may include but is not limited to one of the following schemes: random linear network coding, deterministic linear network coding, BATS code, erasure code, fountain code, convolutional network coding, streaming coding, or the like.

Figure 3A:
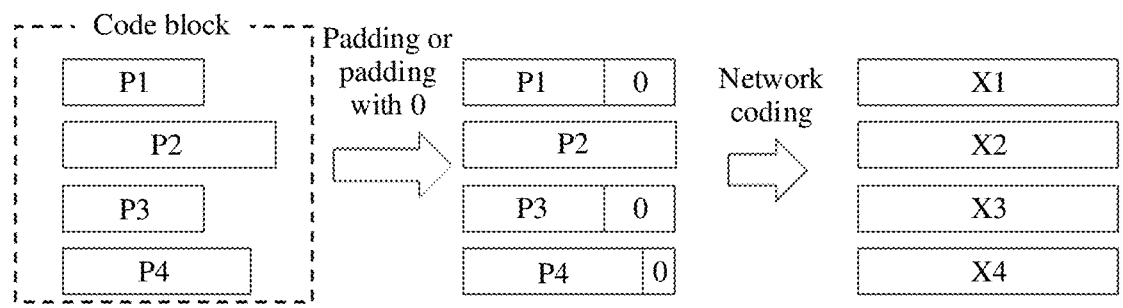
FIG. 3a to FIG. 3c are schematic diagrams of network coding according to embodiments of this application.
Figure 3B:
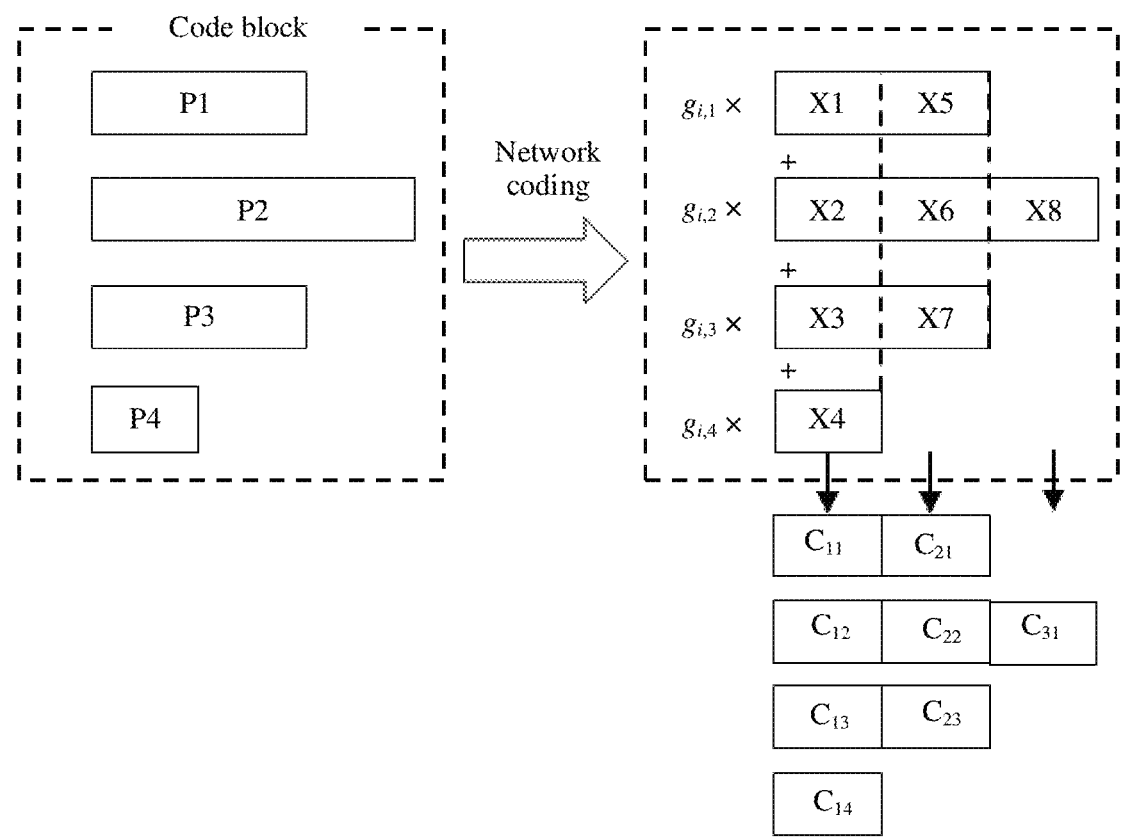
Figures 3C, 4A, 4B, 4C:
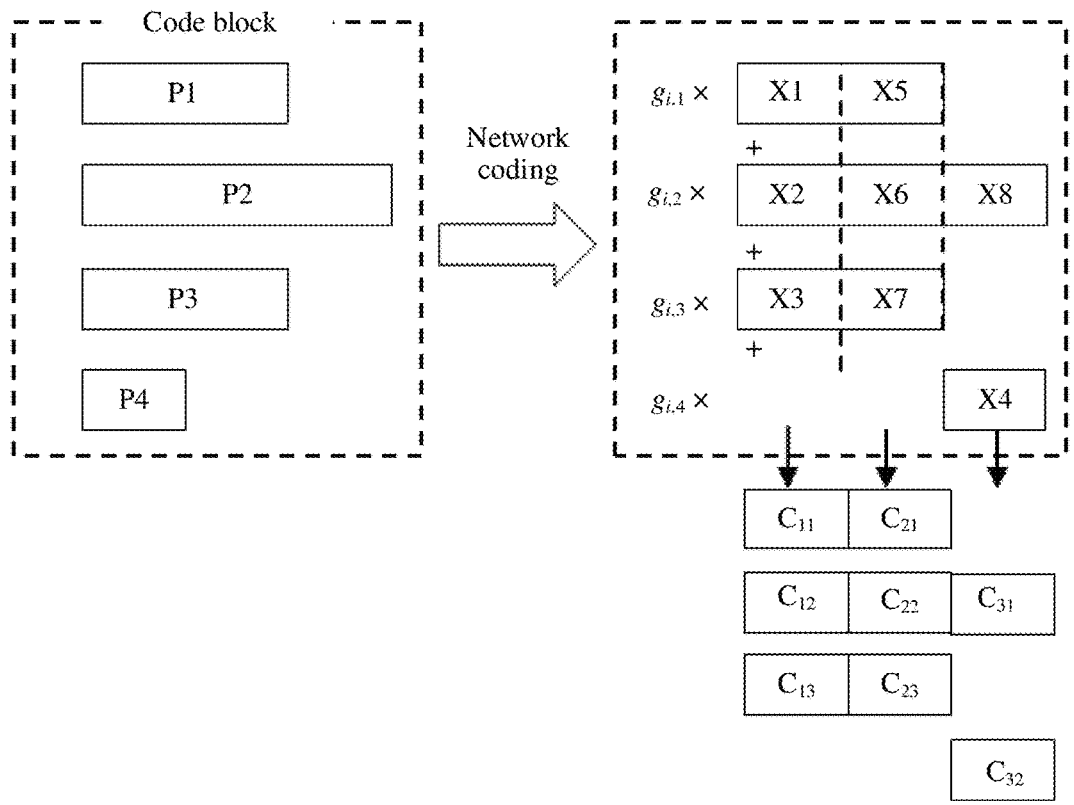
FIG. 4a to FIG. 4e are schematic diagrams of PDUs according to embodiments of this application.

Optionally, if lengths of the M first data segments are different, the network coding may alternatively be performed by using any network coding scheme shown in FIG. 3a to FIG. 3c. It may be understood that FIG. 3a to FIG. 3c are merely examples, and do not constitute any limitation on embodiments of this application. The following describes the network coding schemes shown in FIG. 3a to FIG. 3c.

As shown in FIG. 3a, bit sequences of all first data segments may be padded to obtain a same length through padding or zero padding, and then network coding is performed. The same length may be a length of a longest data segment in the M first data segments, or may be a predefined length, or may be a length configured by the network side device. As shown in FIG. 3a, a code block includes four first data segments, and the four first data segments are respectively P1, P2, P3, and P4. A length of the data segment P2 is the largest. Therefore, the zero padding is performed on the data segment P1, the data segment P3, and the data segment P4, to obtain the length of the data segment P2. Then, the network coding is performed on data segments obtained by performing zero padding, to generate network coded data segments X1, X2, X3, and X4.

As shown in FIG. 3b, head locations of first data segments in a code block may be aligned, and then network coding is performed on aligned parts of the first data segments. As shown in FIG. 3b, data segments P1, P2, P3, and P4 are divided to obtain three aligned parts, and one aligned part includes at least one data segment. For example, a first aligned part includes four data segments X1, X2, X3, and X4, and a length of the aligned part is a length of the data segment P4. A second aligned part includes three data segments X5, X6, and X7, and a length of the aligned part is obtained by subtracting the length of the data segment P4 from a length of the data segment P1 or P3. A third aligned part includes one data segment X8, and a length of the aligned part is obtained by subtracting a length of the data segment P2 from the length of the data segment P1 or P3.

Further, the network coding is separately performed on the data segments included in the aligned parts. That the network coding is performed on the four data segments included in the first aligned part is used as an example for description. The four data segments X1, X2, X3, and X4 included in the first aligned part are respectively multiplied by coefficients gi1, gi2, gi3, and gi4, to perform weighted combination, where i=1, 2, 3, or 4. In this way, four coded segments C11, C12, C13, and C14 may be obtained, and the four coded segments may satisfy the following formula:

$$C11=g11*X1+g12*X2+g13*X3+g14*X4;$$

$$C12=g21*X1+g22*X2+g23*X3+g24*X4;$$

$$C13=g31*X1+g32*X2+g33*X3+g34*X4; \text{ and}$$

$$C14=g41*X1+g42*X2+g43*X3+g44*X4.$$

Similarly, the network coding is performed based on the three data segments included in the second aligned part, and three coded segments C21, C22, and C23 may be respectively obtained; and the network coding is performed based on the data segment included in the third aligned part, and a coded segment C31 may be obtained.

Optionally, one coded segment may be used as one first network coded data segment, or the two coded segments C11 and C21 may be concatenated to be used as one first network coded data segment. Coefficients corresponding to the two coded segments are the same, namely, [g11 g12 g13 g14]. Therefore, [g11 g12 g13 g14] is used as a coding coefficient vector of the first network coded data segment. Similarly, the three coded segments C12, C22, and C31 may be concatenated to be used as one first network coded data segment. Coefficients corresponding to the three coded segments are the same, namely, [g21 g22 g23 g24]. Therefore, [g21 g22 g23 g24] is used as a coding coefficient vector of the first network coded data segment. The two coded segments C13 and C23 may be concatenated to be used as one first network coded data segment, and the coded segment C14 is used as one first network coded data segment. The rest may be deduced by analogy.

As shown in FIG. 3c, head locations of some data segments in a code block may be shifted (to be specific, head locations are not aligned, but some data segments are aligned with each other), and then network coding is performed on aligned parts of first data segments. As shown in FIG. 3c, after a first data segment P4 is shifted, data segments P1, P2, P3, and P4 are divided to obtain three aligned parts, and one aligned part includes at least one data segment. For example, a first aligned part includes three data segments X1, X2, and X3; a second aligned part includes three data segments X5, X6, and X7; and a third aligned part includes two data segments X8 and X4.

Further, the network coding is separately performed on the data segment included in each aligned part, to obtain a coded segment, and the coded segment is mapped to one or more first network coded data segments, to further obtain a coding coefficient vector of each first network coded data segment. For details, refer to the descriptions of the embodiment in FIG. 3b.

After the network coding is performed on the M first data segments to obtain the N first network coded data segments, a network coding parameter corresponding to each of the N first network coded data segments may be further obtained.

The network coding parameter may include coefficient indication information corresponding to the first network coded data segment. The coefficient indication information may include a coding coefficient vector corresponding to the first network coded data segment, or may include index information that can indicate a corresponding coding coefficient vector. The coding coefficient vector may be a code word in a codebook, and the corresponding coding coefficient vector may be indicated by using index information of the code word in the codebook.

The network coding parameter may further include identifier information (for example, a block ID) of a code block corresponding to the first network coded data segment. Further, optionally, the network coding parameter may further include but is not limited to identifier information (for example, a packet ID) of the first network coded data segment in the corresponding code block, and a quantity (for example, the value of M) of first data segments included in the code block corresponding to the first network coded data segment. Optionally, the network coding parameter may further include size or length indication information of the first network coded data segment, or the like.

S101: The first device generates first cyclic redundancy check CRC information and a first data unit based on the first network coded data segment, where the first data unit includes the network coding parameter and the first CRC information that correspond to the first network coded data segment, and the first CRC information is for checking the first network coded data segment.

S102: The first device outputs the first data unit.

Optionally, the first device generates, for each first network coded data segment in the N first network coded data segments, first CRC information corresponding to the first network coded data segment, that is, one first network coded data segment corresponds to one piece of first CRC information. Optionally, the first CRC information may be obtained through calculation based on the first network coded data segment, in other words, the first CRC information covers the first network coded data segment, and the first CRC information is for checking the first network coded data segment. Alternatively, the first CRC information may be obtained through calculation based on the first network coded data segment and the network coding parameter corresponding to the first network coded data segment, in other words, the first network coded data segment and the corresponding network coding parameter are added to the first CRC information as a whole. In this case, the first CRC information covers the first network coded data segment and the network coding parameter corresponding to the first network coded data segment, and the first CRC information is for checking the first network coded data segment and the network coding parameter corresponding to the first network coded data segment.

Optionally, if a CB is used to carry the first network coded data segment, and one CB includes one or more first network coded data segments, one piece of first CRC information may be generated for the CB. Optionally, the first CRC information may be obtained through calculation based on the one or more first network coded data segments included in the CB, in other words, the first CRC information covers the one or more first network coded data segments included in the CB, and the first CRC information is for checking the one or more first network coded data segments included in the CB. Alternatively, the first CRC information may be obtained through calculation based on the one or more first network coded data segments included in the CB and data included in a code block header corresponding to the CB, where the code block header includes a network coding parameter corresponding to the one or more first network coded data segments. The first CRC information covers the one or more first network coded data segments included in the CB and the network coding parameter corresponding to each first network coded data segment. The first CRC information is for checking the one or more first network coded data segments included in the CB and the network coding parameter corresponding to each first network coded data segment. For descriptions of the code block header, refer to descriptions in subsequent embodiments.

In embodiments of this application, the first data unit may be a physical layer TB or a physical layer CB, or may be a PDU of another protocol layer other than a physical layer. One first data unit may include one or more first network coded data segments. It may be understood that the N first network coded data segments obtained by performing network coding on the M first data segments may be distributed in one or more first data units.

In a first optional implementation, if the first data unit is the PDU, the first device generates the PDU based on the one or more first network coded data segments, the network coding parameter corresponding to each of the one or more first network coded data segments, and first CRC information corresponding to each of the one or more first network coded data segments. The protocol layer having the network coding function in the first device outputs the generated PDU to a next layer. There may be a plurality of PDU formats in embodiments of this application. The following describes the PDU formats by using examples with reference to FIG. 4a to FIG. 4f.

Optionally, in a possible design, as shown in FIG. 4a, a PDU includes a protocol header part (for example, a header), a network coded data part (for example, a coded packet), and a check bit CRC part. The protocol header part includes a network coding parameter corresponding to a first network coded data segment. For a definition of the network coding parameter, refer to the descriptions in the foregoing embodiments. The network coded data part includes the first network coded data segment, and the check bit part includes first CRC information corresponding to the first network coded data segment. It may be understood that, the first CRC information may cover the network coded data part, in other words, the first CRC information is obtained through calculation based on the first network coded data segment; or the first CRC information may cover the network coded data part and the protocol header part, in other words, the first CRC information is obtained through calculation based on the first network coded data segment and the network coding parameter corresponding to the first network coded data segment.

Optionally, in another possible design, a PDU includes a protocol header part (header), at least one subheader part (subheader), at least one network coded data part (coded packet), and at least one check bit CRC part. The protocol header part includes quantity indication information, and the quantity indication information indicates a quantity of first network coded data segments included in the PDU. One network coded data part includes one first network coded data segment, one subheader part includes a network coding parameter corresponding to the first network coded data segment, and one check bit part includes one piece of first CRC information. The parts may be arranged in a plurality of manners. The following uses FIG. 4b and FIG. 4c as examples for description.

As shown in FIG. 4b, a corresponding network coded data part is concatenated after a subheader part, and a corresponding check bit part is concatenated after one network coded data part. For example, a subheader part 1 includes a network coding parameter corresponding to a network coded data segment 1, a network coded data part 1 concatenated after the subheader part 1 includes the network coded data segment 1, and a check bit part CRC 1 concatenated after the network coded data part 1 includes first CRC information corresponding to the network coded data segment 1.

It may be understood that first CRC information included in the check bit part in FIG. 4b may cover a first network coded data segment included in a corresponding network coded data part, or may cover a first network coded data segment included in a corresponding network coded data part and a network coding parameter included in a corresponding subheader part. For example, the first CRC information included in the check bit part CRC 1 may cover a first network coded data segment included in the network coded data segment 1, or may cover a first network coded data segment included in the network coded data segment 1 and the network coding parameter included in the subheader part 1.

As shown in FIG. 4c, all subheader parts are concatenated, then corresponding network coded data parts are placed in sequence, and a corresponding check bit part is concatenated after one network coded data part. For example, a subheader part 1 includes a network coding parameter corresponding to a network coded data segment 1, and a subheader part 2 concatenated after the subheader part 1 includes a network coding parameter corresponding to a network coded data segment 2. A network coded data part 1 includes the network coded data segment 1 corresponding to the subheader part 1, and a check bit part CRC 1 concatenated after the network coded data part 1 includes first CRC information corresponding to the network coded data segment 1. A network coded data part 2 includes the network coded data segment 2 corresponding to the subheader part 2, and a check bit part CRC 2 concatenated after the network coded data part 2 includes first CRC information corresponding to the network coded data segment 2. It may be understood that content included in each part is merely an example, and an order of content included in the subheader part may be different from an order of content included in the network coded data part. For example, the network coded data part 1 may include the network coded data segment 2 corresponding to the subheader part 2.

It may be understood that first CRC information included in a check bit part in FIG. 4c may cover a first network coded data segment included in a corresponding network coded data part, or may cover a first network coded data segment included in a corresponding network coded data part and a network coding parameter included in a corresponding subheader part. For example, the first CRC information included in the check bit part CRC 1 may cover the network coded data segment 1, or may cover the network coded data segment 1 and the network coding parameter included in the subheader part 1. This is not limited in embodiments of this application.

Figure 4D:
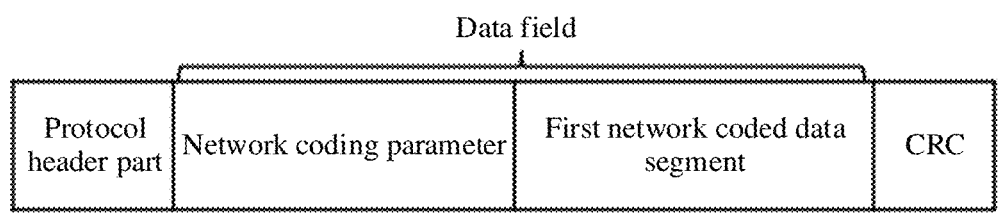

Optionally, as shown in FIG. 4*d*, a PDU includes a protocol header part (header), a data field, and a check bit CRC part. The protocol header part includes information such as a sequence number of the PDU and data field length (bit/byte length) indication information, the data field includes a first network coded data segment and a network coding parameter corresponding to the first network coded data segment, and the check bit part includes first CRC information. It may be understood that, the first CRC information may cover the first network coded data segment in the data field, or the first CRC information may cover the first network coded data segment and the network coding parameter in the data field.

Figure 4E:
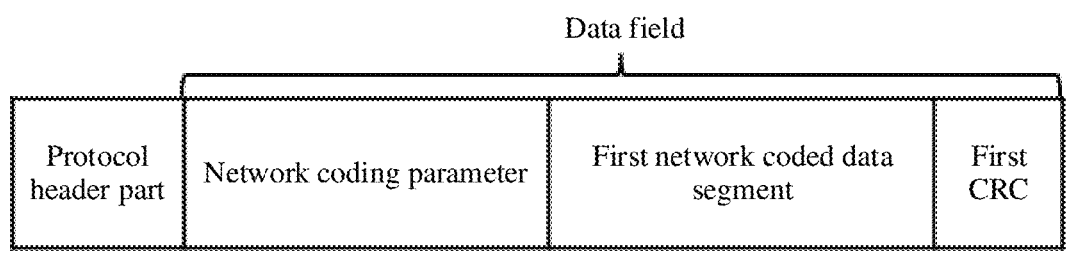

Optionally, as shown in FIG. 4*e*, a PDU includes a protocol header part (header) and a data field. The protocol header part includes information such as a sequence number of the PDU and data field length (bit/byte length) indication information, the data field includes a first network coded data segment, a network coding parameter corresponding to the first network coded data segment, and first CRC information. It may be understood that, the first CRC information may cover the first network coded data segment in the data field, or the first CRC information may cover the first network coded data segment and the network coding parameter in the data field.

For example, for the PDUs in FIG. 4*a* to FIG. 4*e*, CRC information may be added after the protocol header part (header) or the subheader part (subheader). The CRC information covers the protocol header part or the subheader part, and is used by a receive end to detect whether the protocol header part or the subheader part is correctly transmitted.

Figure 4F:
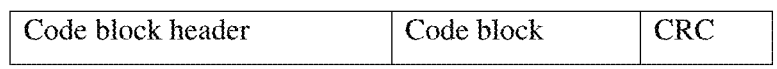
FIG. 4f is a schematic diagram of a code block according to an embodiment of this application.

In a second optional implementation, if the first data unit is the CB, as shown in FIG. 4*f*, the first data unit may include a code block header, a code block, and a check bit part, the code block includes at least one first network coded data segment, and the check bit part includes first CRC information corresponding to the code block. Optionally, the first CRC information may be generated based on the at least one first network coded data segment included in the code block, or the first CRC information may be generated based on the at least one first network coded data segment included in the code block and data included in the code block header.

Optionally, a code block header of a code block may include indication information corresponding to one or more first network coded data segments carried in the code block. The indication information includes but is not limited to a quantity of first network coded data segments included in the code block, start and end location indication information of each first network coded data segment included in the code block, size or length information of each first network coded data segment, identifier information (block ID) of the code block corresponding to each first network coded data segment, identifier information (packet ID) of the first network coded data segment in the corresponding code block, coefficient indication information for generating the first network coded data segment, indication information of a quantity of first original data segments included in the code block corresponding to the first network coded data segment, and the like.

For example, CRC information may be added to only a code block header, and the CRC information is used by a receive end to detect whether the code block header is correctly transmitted.

In embodiments of this application, if the first data unit is the PDU, outputting the first data unit may be understood as outputting the first data unit to a protocol of a next layer for processing. For example, if an RLC layer generates a first data unit, the first data unit may be output to a MAC layer for processing. If the first data unit is the physical layer TB, outputting the first data unit may be understood as: after performing, for example, code block segmentation, CRC addition, channel coding, and rate matching on the first data unit, performing operations such as code block concatenation, scrambling, modulation, and resource mapping on the first data unit, and then sending the first data unit to a second device. If the first data unit is the physical layer CB, outputting the first data unit may be understood as: after performing, for example, channel coding and rate matching on the first data unit, performing operations such as code block concatenation, scrambling, modulation, and resource mapping on the first data unit, and then sending the first data unit to a second device.

S103: The first device processes the first data unit, and transmits the first data unit to the second device.

In an embodiment, different processing may be performed based on a form of the first data unit, and then the first data unit is transmitted to the second device after being processed. For example, if the first data unit is the PDU, the first data unit is output to a protocol of a next layer for processing until reaching the physical layer. The physical layer performs, for example, LDPC channel coding and rate matching, and then performs operations such as code block concatenation, scrambling, modulation, and resource mapping, to form a to-be-sent signal and transmit the to-be-sent signal to the second device. If the first data unit is the physical layer TB, after code block segmentation, CRC addition, channel coding, and rate matching are performed on the first data unit, operations such as code block concatenation, scrambling, modulation, and resource mapping are performed on the first data unit, and then the first data unit is sent to the second device. If the first data unit is the physical layer CB, after channel coding and rate matching are performed on the first data unit, operations such as code block concatenation, scrambling, modulation, and resource mapping are performed on the first data unit, and then the first data unit is sent to the second device.

S104: The second device obtains a second data unit, where the second data unit includes a second network coded data segment, a network coding parameter corresponding to the second network coded data segment, and third CRC information.

In an embodiment, the second device obtains a received signal, and obtains the second data unit in the received signal after performing operations such as demodulation, descrambling, and channel decoding on the received signal. It may be understood that a type of the second data unit is the same as that of the first data unit in step S103 and step S102. For example, if the first data unit is an RLC layer PDU, the second data unit is also an RLC layer PDU. If the first data unit is a physical layer data unit, the second data unit is also a physical layer data unit. In a radio channel environment, the second data unit and the first data unit may be different due to factors such as fading caused by channel noise or mobility or interference caused by other users. The second data unit includes the second network coded data segment, the network coding parameter corresponding to the second network coded data segment, and the third CRC information. The second network coded data segment may be the same as or different from the first network coded data segment. If the second network coded data segment is different from the first network coded data segment, it indicates that the second network coded data segment is incorrectly transmitted. If the second network coded data segment is the same as the first network coded data segment, it indicates that the second network coded data segment is correctly transmitted.

The network coding parameter corresponding to the second network coded data segment includes identifier information (block ID) of a code block corresponding to the second network coded data segment. A protocol layer or a protocol entity having a network coding function in the second device stores each second network coded data segment in a corresponding reception buffer based on the identifier information of the code block corresponding to each second network coded data segment; performs CRC check on all second network coded data segments in a same code block; and decodes a correctly checked second network coded data segment. For details, refer to descriptions of step S105 and step S106.

S105: The second device checks the second network coded data segment by using the third CRC information; and determines, based on a check result, that the second network coded data segment is correctly transmitted.

In an embodiment, the third CRC information corresponding to the second network coded data segment may cover the second network coded data segment, or the third CRC information may cover the second network coded data segment and the network coding parameter corresponding to the second network coded data segment. This is not limited in embodiments of this application.

If the third CRC information covers the second network coded data segment, the second device checks the second network coded data segment by using the third CRC information corresponding to the second network coded data segment, to obtain a check result, where the check result indicates whether the second network coded data segment is correctly transmitted. If the second network coded data segment is correctly transmitted, the second device decodes the second network coded data segment based on the network coding parameter corresponding to the second network coded data segment.

If the third CRC information covers the second network coded data segment and the network coding parameter corresponding to the second network coded data segment, the second device checks, for the second network coded data segment by using the third CRC information corresponding to the second network coded data segment, the second network coded data segment and the network coding parameter corresponding to the second network coded data segment, to obtain a check result, where the check result indicates whether the second network coded data segment and the network coding parameter are correctly transmitted. If the second network coded data segment and the network coding parameter are correctly transmitted, the second device decodes the second network coded data segment based on the network coding parameter.

Optionally, if the second data unit is a physical layer CB, a code block includes at least one second network coded data segment, and the third CRC information is CRC information corresponding to the code block. The at least one second network coded data segment may be checked by using the third CRC information, to determine whether the at least one second network coded data segment included in the code block is correctly transmitted.

S106: The second device decodes the second network coded data segment based on the network coding parameter.

In an embodiment, if the first device performs network coding on M first data segments in a same group of code block to obtain N first network coded data segments, accordingly, the second device performs decoding based on network coding parameters corresponding to L second network coded data segments that are correctly transmitted and that are in N second network coded data segments corresponding to a same group of code block, where L is a natural number greater than or equal to M and less than or equal to N.

For example, a rank of a coefficient matrix formed by coding coefficient vectors corresponding to the L second network coded data segments is M. The coding coefficient vectors respectively corresponding to the L second network coded data segments are combined together to form a system of linear equations in M variables with respect to unknown numbers $X_1, X_2, \ldots, X_M$, and M second data segments may be obtained through decoding by using the system of equations.

Optionally, if a first data segment on which the first device performs network coding includes a first original data segment, accordingly, the second data segment includes a second original data segment, that is, the M second data segments obtained through decoding are M to-be-obtained second original data segments. If a first data segment on which the first device performs network coding includes a first original data segment and second CRC information, accordingly, the second data segment includes a second original data segment and fourth CRC information. The second device checks the second original data segment by using the fourth CRC information; and determines, based on a check result, whether the second original data segment is correctly transmitted. The second device uses a correctly transmitted second original data segment as a to-be-obtained original data segment.

In a possible implementation, if the first device performs network coding by using the network coding scheme shown in FIG. 3b or FIG. 3c, the second device may obtain each coded segment, for example, obtain coded segments C11, C21, C31, C12, C22, C13, C23, and C14. Further, each data segment may be obtained through decoding based on a coding coefficient vector [gi1 gi2 gi3 gi4] and each coded segment. For example, the second device obtains the coded segments C11, C12, C13, and C14, and may form four systems of equations with respect to four unknown numbers based on the code coefficient vector [gi1 gi2 gi3 gi4] corresponding to the coded segments, to obtain the data segments X1, X2, X3, and X4 through decoding. The obtained data segments are combined to obtain second original data segments.

Figure 5:
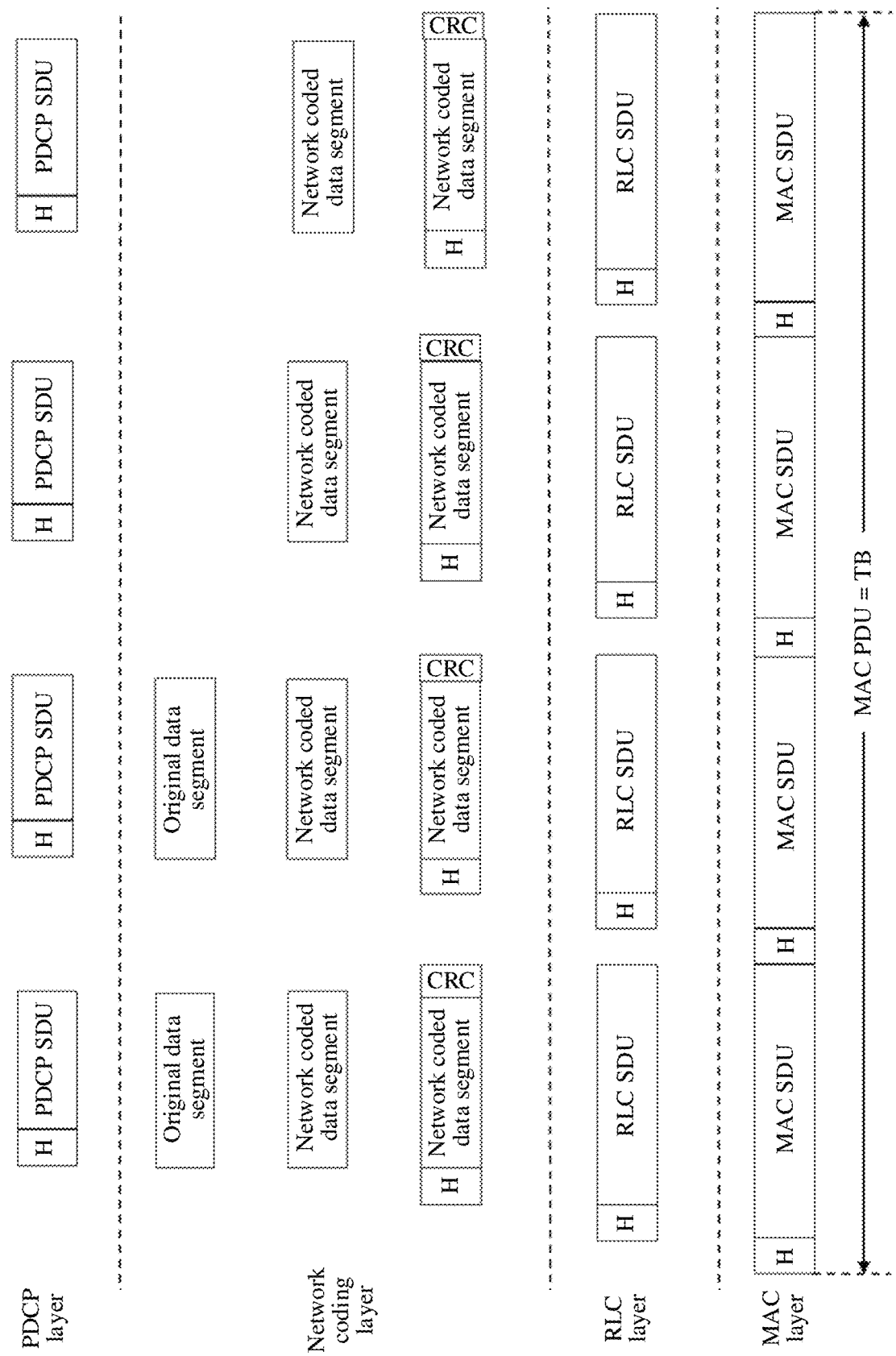
FIG. 5 is a schematic diagram of transmission of network coded data according to an embodiment of this application.
Figure 6:
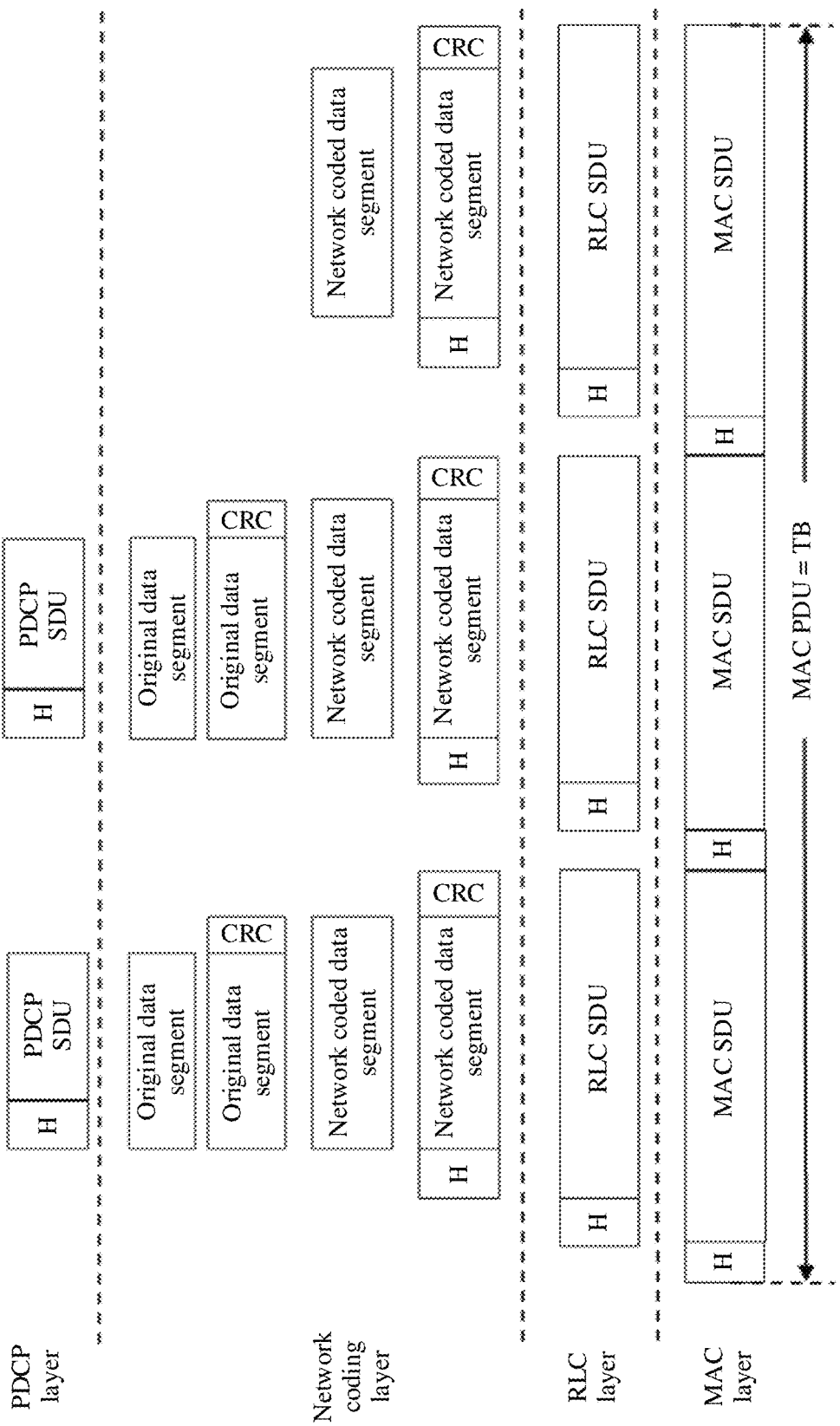
FIG. 6 is another schematic diagram of transmission of network coded data according to an embodiment of this application.
Figure 7:
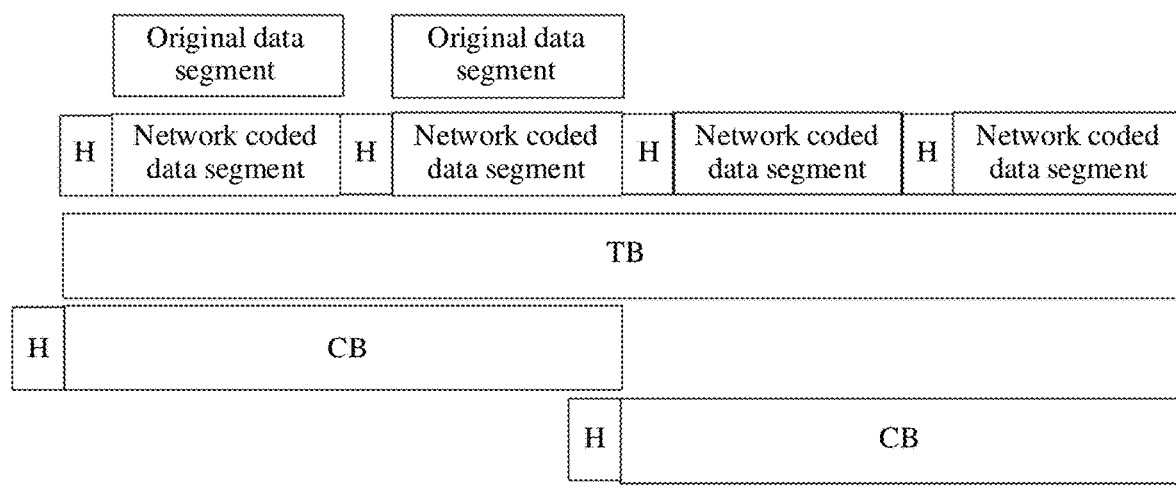
FIG. 7 is still another schematic diagram of transmission of network coded data according to an embodiment of this application.

With reference to FIG. 5 to FIG. 7, the method shown in FIG. 2 is described in more detail. For ease of understanding, FIG. 5 to FIG. 7 are described by using an example in which a new protocol layer (a network coding layer) is added between a PDCP layer and an RLC layer, and the network coding layer has a network coding function. For ease of description, in embodiments in FIG. 5 to FIG. 7, the first device is referred to as a transmit end, and the second device is referred to as a receive end. The first original data segment and the second original data segment are collectively referred to as an original data segment, the first network coded data segment and the second network coded data segment are collectively referred to as a network coded data segment, and the first CRC information, the second CRC information, the third CRC information, and the fourth CRC information are collectively referred to as CRC information.

In the embodiment in FIG. 5, a transmit end performs network coding on an original data segment, to obtain a network coded data segment, and then adds CRC information to the obtained network coded data segment. In the embodiment in FIG. 6, after adding CRC information to an original data segment, a transmit end performs network coding on the original data segment to which the CRC information is added, to obtain a network coded data segment, and then adds CRC information to the obtained network coded data segment. In both FIG. 5 and FIG. 6, the network coded data segment is carried by using a PDU. In the embodiment in FIG. 7, a network coded data segment is carried by using a physical layer CB.

As shown in FIG. 5, a network coding layer of the transmit end receives a PDCP PDU transmitted by an upper layer PDCP layer. The network coding layer may use a plurality of PDCP PDUs as a group of code block, or may use one PDCP PDU as a group of code block, or select, according to a predefined rule or a semi-persistent configuration rule, a PDCP PDU of a corresponding size or length as a group of code block. The group of code block may include a non-integer quantity of PDCP PDUs. A bit sequence of the group of code block is segmented according to the predefined rule or the semi-persistent configuration rule, to obtain a plurality of original data segments. The rule may include information such as a total quantity of bits included in one group of code block, a quantity of original data segments included in one group of code block, and a size or a size limit of a quantity of bits of one original data segment. For example, the predefined rule may be that a quantity of original data segments included in one group of code block is 2, and a quantity of bits of one original data segment is 500 bytes. If a size of the PDCP PDU received by the network coding layer is 1000 bytes, the PDCP PDU forms one group of code block, and the PDCP PDU is segmented to obtain two original data segments $X_1$ and $X_2$.

The network coding is performed on the plurality of original data segments obtained through segmentation, to generate at least one network coded data segment. A network coding rule may be predefined or configured in a semi-persistent manner, and the network coding rule includes information such as a network coding scheme and a size of a network coding GF field. The network coding scheme may be random linear network coding, deterministic linear network coding, BATS code, erasure code, fountain code, convolutional network coding, streaming coding, or the like.

For example, the predefined network coding rule is the random linear network coding, and the size of the network coding GF field is configured as GF(4). In this case, the random linear network coding is performed on the foregoing two obtained original data segments $X_1$ and $X_2$, to generate three network coded data segments, where the three network coded data segments are respectively represented as $Y_1$, $Y_2$, $Y_3$, and $Y_1$, $Y_2$, $Y_3$ satisfy a formula $Y_i = \Sigma_{m=1}^{M} g_{i,m} \times X_m$. Coefficients $g_1$, $g_2$, $g_3$ that are randomly selected for generating the three network coded data segments may be $g_1=[1\ 0]$, $g_2=[2\ 3]$, and $g_3=[3\ 1]$ respectively.

Then, a network coding layer PDU is generated based on the network coded data segment, where the PDU includes a protocol header part H, a network coded data part, and a check bit part CRC. The protocol header part includes a network coding parameter, the check bit part includes CRC information, and the network coded data part includes the network coded data segment. For a plurality of forms of the PDU, refer to the descriptions in the foregoing embodiments. It may be understood that the CRC information may cover the network coded data segment, or may cover the network coded data segment and the network coding parameter. The generated network coding layer PDU is sent to a next layer, namely, the RLC layer. Finally, the network coded data segment is sent to a receive end by using a physical layer TB. It may be understood that network coded data segments of a same code block may be sent by using a single TB, or may be sent by using different TBs.

A physical layer of the receive end sends all received information bit sequences to an upper layer MAC layer. Optionally, regardless of whether the TB is correct, the MAC layer delivers an RLC PDU obtained through parsing to an upper layer, and the RLC layer delivers a network coding layer PDU obtained through parsing to a network coding layer. To be specific, the MAC layer may not perform CRC check on the TB, or the MAC layer performs CRC check on the TB, but delivers the PDU to the upper layer even if a TB error is found.

The network coding layer of the receive end receives all network coding layer PDUs sent by the network coding layer of the transmit end, where the network coding layer PDU includes a network coded data segment, a network coding parameter corresponding to the network coded data segment, and CRC information corresponding to the network coded data segment. The network coding layer of the receive end stores the network coding layer PDU in a corresponding reception buffer based on a code block ID indicated by the network coding parameter in each network coding layer PDU. For the network coding layer PDU, the CRC check is further performed on the corresponding network coded data segment based on the CRC information. A network coded data segment for which the CRC check is correct is obtained, and the network coded data segment is decoded based on a network coding parameter corresponding to the network coded data segment, to obtain an original data segment.

The following continues to use the foregoing example of generating $Y_1$, $Y_2$, $Y_3$ by using the coefficients $g_1$, $g_2$, $g_3$ in a network coding process to describe a decoding process. The network coding layer of the receive end receives $Y_1$, $Y_2$, $Y_3$ that are sent by a bottom layer and that include network coding parameters and CRC information, and separately performs CRC check on $Y_1$, $Y_2$, $Y_3$. Due to impact of a channel factor, for example, fading caused by channel noise or mobility or interference caused by another user, a transmission error may occur on a part of $Y_1$, $Y_2$, $Y_3$, that is, a CRC check error occurs. For example, the CRC check is performed on $Y_2$ and a result is incorrect, and the CRC check is performed on $Y_1$ and $Y_3$ and both results are correct. In this case, the coding coefficient vector $g_1$ of $Y_1$ and the coding coefficient vector $g_3$ of $Y_3$ are combined together to form a system of linear equations in two variables with respect to unknown numbers $X_1$, $X_2$, where the system of linear equations in two variables satisfies a formula:

$$Y_1 = 1*X_1 + 0*X_2$$

$$Y_3 = 3*X_1 + 1*X_2$$

A coefficient matrix of the system of equations satisfies the following matrix:

$$G = \begin{bmatrix} g_{1,1} & g_{1,2} \\ g_{3,1} & g_{3,2} \end{bmatrix} = \begin{bmatrix} 1 & 0 \\ 3 & 1 \end{bmatrix}$$

Because a rank of the foregoing coefficient matrix is 2, which is the same as a quantity of unknown numbers or a quantity of original data segments, the receive end may obtain 2 original data segments through decoding by using the coefficient matrix.

As shown in FIG. 6, a network coding layer of a transmit end obtains a plurality of original data segments. For a method for obtaining the original data segment, refer to the descriptions of the embodiment in FIG. 5. Further, CRC information is respectively added to each original data segment, in other words, one piece of CRC information is added to one original data segment. The CRC information is obtained through calculation based on the original data segment, in other words, the CRC information is for checking the original data segment.

Network coding is performed on the plurality of original data segments to which the CRC information is added, to generate at least one network coded data segment. CRC information corresponding to the network coded data segment is generated for each network coded data segment, that is, one network coded data segment corresponds to one piece of CRC information. The CRC information is obtained through calculation based on the network coded data segment, in other words, the CRC information is for checking the network coded data segment. Further, a network coding layer PDU is generated based on the network coded data segment, and the network coding layer PDU is sent to a receive end, where the network coding layer PDU includes the network coded data segment, a network coding parameter corresponding to the network coded data segment, and the CRC information corresponding to the network coded data segment. For a network coding scheme and a transmission manner of the network coding layer PDU, refer to the descriptions in the embodiment in FIG. 5.

A physical layer of the receive end sends all received information bit sequences to an upper layer MAC layer. Optionally, regardless of whether a TB is correct, the MAC layer delivers an RLC PDU obtained through parsing to an upper layer, and the RLC layer delivers a network coding layer PDU obtained through parsing to a network coding layer. To be specific, the MAC layer may not perform CRC check on the TB, or the MAC layer performs CRC check on the TB, but delivers the PDU obtained through parsing to the upper layer even if a TB error is found.

The network coding layer of the receive end receives all network coding layer PDUs sent by the network coding layer of the transmit end, where the network coding layer PDU includes the network coded data segment, the network coding parameter corresponding to the network coded data segment, and the CRC information corresponding to the network coded data segment. The network coding layer of the receive end stores the network coding layer PDU in a corresponding reception buffer based on a code block ID indicated by the network coding parameter in each network coding layer PDU. For the network coding layer PDU, the CRC check is further performed on the corresponding network coded data segment based on the CRC information. A network coded data segment for which the CRC check is correct is obtained, and the network coded data segment is decoded based on a network coding parameter corresponding to the network coded data segment, to obtain the original data segment including the CRC information. For a manner of performing decoding based on the network coding parameter, refer to the descriptions in the embodiment in FIG. 5.

After the original data segment including the CRC information is obtained, the CRC check is performed on the corresponding original data segment by using the CRC information, to obtain an original data segment for which the CRC check is correct.

As shown in FIG. 7, a network coding layer of a transmit end sends a network coded data segment to a physical layer, and sends the network coded data segment to a receive end by using a physical layer TB. Specifically, optionally, the physical layer of the transmit end performs code block segmentation on the TB to obtain a plurality of code blocks CBs. Optionally, when the TB is segmented, a size of one CB may be a size of one network coded data segment or a size of a plurality of network coded data segments. All CBs in one TB may have a same length or different lengths. This is not limited in embodiments of this application.

Further, optionally, a code block header is added to the CB that is obtained by performing segmentation. The code block header includes a quantity of network coded data segments carried in the CB, and may further include start location and/or end location indication information of each network coded data segment carried in the CB, size or length information of each network coded data segment, identifier information (block ID) of a code block corresponding to each network coded data segment, identifier information (packet ID) of the network coded data segment in the corresponding code block, coefficient indication information for generating the network coded data segment, indication information of a quantity of original data segments included in the code block corresponding to the network coded data segment, and the like. CRC information is added to the CB. The CRC information may cover a data part of the CB, or the CRC information may cover the code block header corresponding to the CB and a data part of the CB. Optionally, the CRC information may be added to only the code block header of the CB.

A physical layer of the receive end performs CRC check on each CB in the TB; parses a code block header corresponding to a CB for which the CRC check is correct; further selects all network coded data segments included in the CB for which the CRC check is correct; and delivers the network coded data segments to an upper layer. Finally, a network coding layer receives the network coded data segment and a network coding parameter corresponding to the network coded data segment. The network coded data segment is stored in a corresponding reception buffer based on the identifier information of the code block indicated in the network coding parameter. Further, the network coded data segment stored in a group of code block is decoded based on a coding coefficient vector in the network coding parameter, to obtain an original data segment. For a manner of decoding the network coded data segment, refer to the descriptions in the embodiment in FIG. 5.

Figure 8:
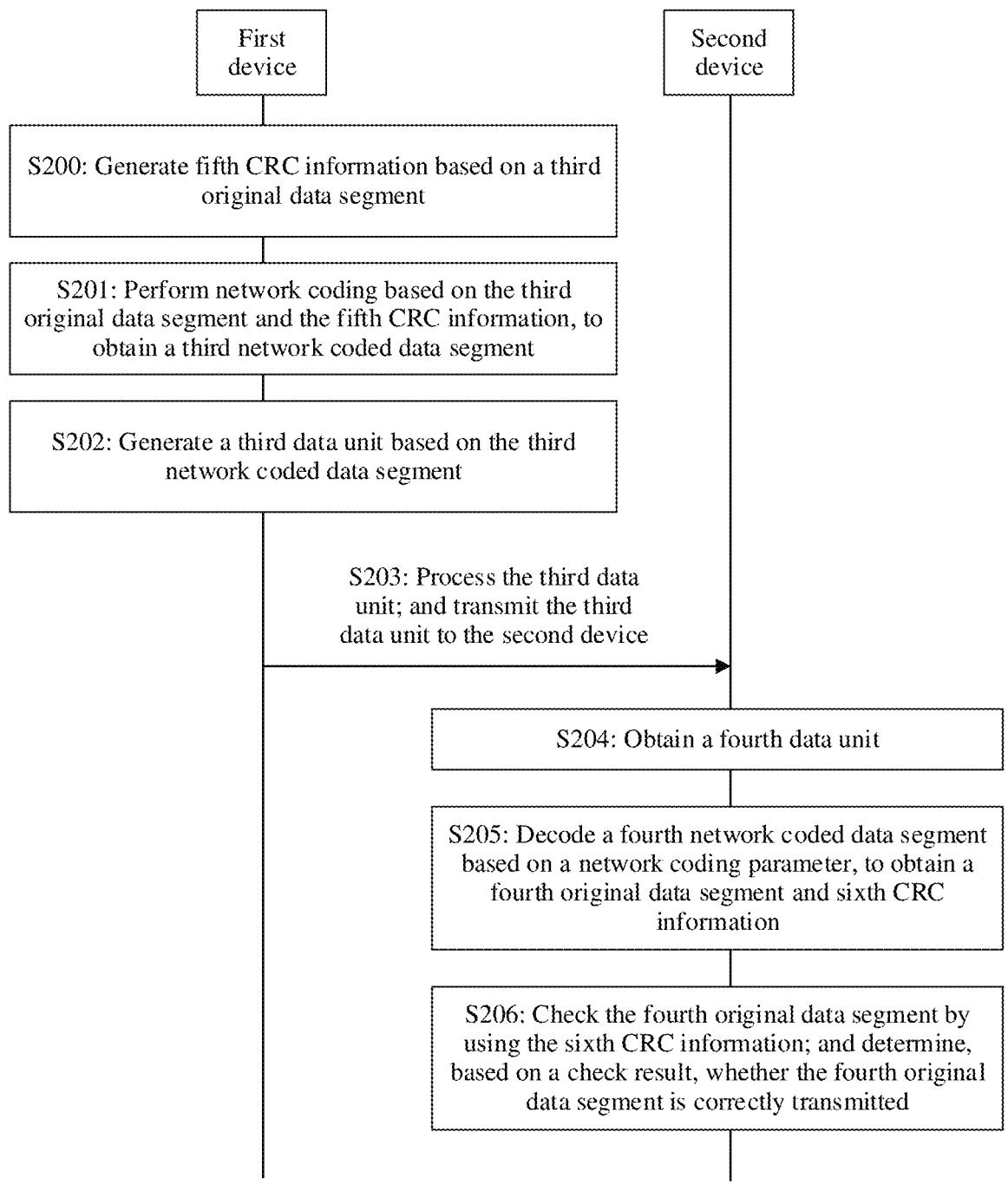
FIG. 8 is a schematic flowchart of another data transmission method according to an embodiment of this application.

FIG. 8 is a schematic flowchart of another data transmission method according to an embodiment of this application. The method includes but is not limited to the following steps.

S200: A first device generates fifth CRC information based on a third original data segment.

S201: The first device performs network coding based on the third original data segment and the fifth CRC information, to obtain a third network coded data segment.

In an embodiment, the first device generates the fifth CRC information corresponding to the third original data segment for each third original data segment, that is, one third original data segment corresponds to one piece of fifth CRC information; and adds the fifth CRC information to the third original data segment. Optionally, the fifth CRC information may be obtained through calculation based on the third original data segment, in other words, the fifth CRC information covers the third original data segment, and the fifth CRC information is for checking the third original data segment.

In an embodiment, the first device may perform network coding on at least one third original data segment to which the fifth CRC information is added, to obtain at least one third network coded data segment. The at least one third original data segment may be a data segment that belongs to a same code block.

Optionally, a protocol layer or a protocol entity having a network coding function divides to-be-sent data into a plurality of groups of code block, and one group of code block includes at least two third original data segments. Each group of code block may be distinguished by using identifier information, for example, a block ID. The to-be-sent data may be one or more PDUs sent by an upper layer protocol, or may be one or more SDUs or SDU segments of a current protocol layer, or may be a physical layer TB or a physical layer CB. This is not limited in embodiments of this application.

The third original data segments in the group of code block may have a same size or different sizes. For example, a network side device may limit or perform semi-persistent configuration on the size (a quantity of bits or a quantity of bytes) of the third original data segment, or may obtain the third original data segment in a predefined manner. For example, the first device sequentially selects data bits of a size of 1000 bytes once as one third original data segment. For another example, if the network coding is implemented at a physical layer, one CB may be used as one third original data segment.

For example, a quantity of third original data segments included in one group of code block is represented as M, where M≥2. The network side device may limit or perform semi-persistent configuration on a value of M, or a value of M may be predefined, for example, M=8. Alternatively, a transmit end may determine a value of M, but needs to notify a receive end of the value of M.

Further, the first device may generate, for each third original data segment in the M third original data segments, fifth CRC information corresponding to the third original data segment; and add the generated fifth CRC information to the third original data segment. A total of M third original data segments to which the fifth CRC information is added may be obtained.

The network coding is performed on the M third original data segments to which the fifth CRC information is added, to obtain N third network coded data segments. For example, the N third network coded data segments are respectively $Y_1, Y_2, \ldots, Y_N$ (N≥1). It may be understood that a network coding scheme used for the network coding in embodiments of this application is predefined or configured in a semi-persistent manner. The network coding scheme may include but is not limited to one of the following schemes: random linear network coding, deterministic linear network coding, BATS code, erasure code, fountain code, convolutional network coding, streaming coding, or the like.

Optionally, if the M third original data segments have different sizes, bit sequences of all the third original data segments may be padded with 0, to obtain a maximum length of the M third original data segments, then fifth CRC information is generated for each third original data segment, and the network coding is further performed on the M third original data segments to which the fifth CRC information is added.

After the network coding is performed on the M third original data segments to obtain the N third network coded data segments, a network coding parameter corresponding to each of the N third network coded data segments may be further obtained.

The network coding parameter may include coefficient indication information corresponding to the third network coded data segment. The coefficient indication information may include a coding coefficient vector corresponding to the third network coded data segment, or may include index information that can indicate a corresponding coding coefficient vector. The coding coefficient vector may be a code word in a codebook, and the corresponding coding coefficient vector may be indicated by using index information of the code word in the codebook.

The network coding parameter may further include identifier information (for example, a block ID) of a code block corresponding to the third network coded data segment. Further, optionally, the network coding parameter may further include identifier information (for example, a packet ID) of the third network coded data segment in the corresponding code block, and a quantity (for example, the value of M) of third original data segments included in the code block corresponding to the third network coded data segment. Optionally, the network coding parameter may further include length or size indication information of the third network coded data segment, or the like.

S202: The first device generates a third data unit based on the third network coded data segment, where the third data unit includes the network coding parameter corresponding to the third network coded data segment.

S203: The first device processes the third data unit, and transmits the third data unit to a second device.

In an embodiment, the protocol layer or the protocol entity having the network coding function of the first device combines one or more third network coded data segments and a corresponding network coding parameter into the third data unit, and sends the third data unit to a next layer. It may be understood that the N third network coded data segments obtained by performing network coding on the M third original data segments to which the fifth CRC information is added may be distributed in one or more third data units. Optionally, the third data unit may be a physical layer TB or a physical layer CB, or may be a PDU of another protocol layer other than a physical layer. There may be a plurality of PDU formats in embodiments of this application. The following describes the PDU formats by using examples with reference to FIG. 9a to FIG. 9d.

Figure 9A:
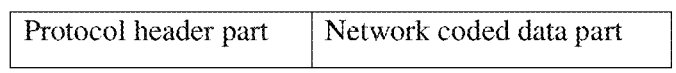
FIG. 9a to FIG. 9d are schematic diagrams of PDUs according to embodiments of this application.

Optionally, as shown in FIG. 9a, a PDU includes a protocol header part (for example, a header) and a network coded data part (for example, a coded packet). The protocol header part includes a network coding parameter corresponding to a third network coded data segment. For a definition of the network coding parameter, refer to the descriptions in the foregoing embodiments. The network coded data part includes the third network coded data segment.

Optionally, a PDU includes a protocol header part (header), at least one subheader part (subheader), and at least one network coded data part (coded packet). The protocol header part includes quantity indication information, and the quantity indication information indicates a quantity of third network coded data segments included in the PDU. One network coded data part includes one third network coded data segment, and one subheader part includes a network coding parameter corresponding to the third network coded data segment. The parts may be arranged in a plurality of manners. The following uses FIG. 9b and FIG. 9c as examples for description.

Figures 9B, 9C, 9D:
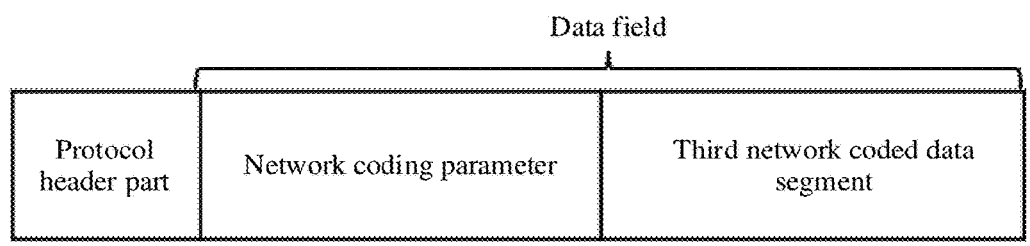

As shown in FIG. 9b, a corresponding network coded data part is concatenated after a subheader part. For example, a subheader part 1 includes a network coding parameter corresponding to a network coded data segment 1, and a network coded data part 1 concatenated after the subheader part 1 includes the network coded data segment 1. A subheader part 2 includes a network coding parameter corresponding to a network coded data segment 2, and a network coded data part 2 concatenated after the subheader part 2 includes the network coded data segment 2. The network coded data segment 1 and the network coded data segment 2 may be obtained by performing network coding on the M third original data segments to which the fifth CRC information is added. For details, refer to the descriptions in the foregoing embodiments.

As shown in FIG. 9c, all subheader parts are concatenated, and then corresponding network coded data parts are placed in sequence. For example, a subheader part 1 includes a network coding parameter corresponding to a network coded data segment 1, and a subheader part 2 concatenated after the subheader part 1 includes a network coding parameter corresponding to a network coded data segment 2. A network coded data part 1 includes the network coded data segment 1 corresponding to the subheader part 1. A network coded data part 2 includes the network coded data segment 2 corresponding to the subheader part 2. It may be understood that content included in each part is merely an example, and an order of content included in the subheader part may be different from an order of content included in the network coded data part. For example, the network coded data part 1 may include the network coded data segment 2 corresponding to the subheader part 2.

Optionally, as shown in FIG. 9d, a PDU includes a protocol header part (header) and a data field. The protocol header part includes information such as a sequence number of the PDU and data field length (bit/byte length) indication information, the data field includes a third network coded data segment and a network coding parameter corresponding to the third network coded data segment. For a definition of the network coding parameter, refer to the descriptions in the foregoing embodiments. The third network coded data segment may be obtained by performing network coding on the M third original data segments to which the fifth CRC information is added.

For example, for the PDUs in FIG. 9a to FIG. 9d, a CRC check bit may be added after the protocol header part (header) or the subheader part (subheader). The CRC check bit covers the protocol header part or the subheader part, and is used by the receive end to detect whether the protocol header part or the subheader part is correctly transmitted.

In embodiments of this application, if the third data unit is the PDU, the third data unit may be output to a protocol of a next layer for processing. For example, if an RLC layer generates a third data unit, the third data unit may be output to a MAC layer for processing until reaching a physical layer. The physical layer transmits the third data unit to the second device by using a TB. Optionally, the physical layer performs low density parity check (LDPC) channel coding and rate matching on the third data unit, and then performs operations such as code block concatenation, scrambling, modulation, and resource mapping, to form a to-be-sent signal, and sends the to-be-sent signal to the second device.

S204: The second device obtains a fourth data unit, where the fourth data unit includes a fourth network coded data segment and a network coding parameter corresponding to the fourth network coded data segment.

In an embodiment, the second device obtains a received signal, and obtains the fourth data unit in the received signal after performing operations such as demodulation, descrambling, and channel decoding on the received signal. It may be understood that a type of the fourth data unit is the same as that of the third data unit in step S202 and step S203. For example, if the third data unit is an RLC layer PDU, the fourth data unit is also an RLC layer PDU. If the third data unit is a physical layer data unit, the fourth data unit is also a physical layer data unit. In a radio channel environment, the fourth data unit and the third data unit may be different due to factors such as fading caused by channel noise or mobility or interference caused by other users. The fourth data unit includes the fourth network coded data segment and the network coding parameter corresponding to the fourth network coded data segment.

The fourth network coded data segment may be the same as or different from the third network coded data segment. If the fourth network coded data segment is different from the third network coded data segment, it indicates that the fourth network coded data segment is incorrectly transmitted. If the fourth network coded data segment is the same as the third network coded data segment, it indicates that the fourth network coded data segment is correctly transmitted. In embodiments of this application, regardless of whether the fourth network coded data segment is correctly transmitted, step S205 is performed, to be specific, decoding is performed on the fourth network coded data segment.

The network coding parameter corresponding to the fourth network coded data segment includes identifier information (block ID) of a code block corresponding to the fourth network coded data segment. A protocol layer or a protocol entity having a network coding function in the second device stores each fourth network coded data segment in a corresponding reception buffer based on the identifier information of the code block corresponding to each fourth network coded data segment, and decodes all fourth network coded data segments corresponding to a same code block based on corresponding network coding parameters. For details, refer to descriptions of step S205.

S205: The second device decodes the fourth network coded data segment based on the network coding parameter, to obtain a fourth original data segment and sixth CRC information.

In an embodiment, the second device decodes N fourth network coded data segments corresponding to a same group of code block. Coding coefficient vectors respectively corresponding to the N fourth network coded data segments are combined together to form a system of linear equations in M variables with respect to unknown numbers $X_1, X_2, \ldots, X_M$. At least one group of results may be obtained through decoding by using the system of equations, and one group of results includes M fourth original data segments including the sixth CRC information.

S206: The second device checks the fourth original data segment by using the sixth CRC information; and determines, based on a check result, whether the fourth original data segment is correctly transmitted.

In an embodiment, for the M fourth original data segments including the sixth CRC information in the group of results, the second device checks the fourth original data segment by using the sixth CRC information; and determines, based on a check result, whether the fourth original data segment is correctly transmitted. The second device uses a correctly transmitted fourth original data segment as a to-be-obtained original data segment.

Figure 10:
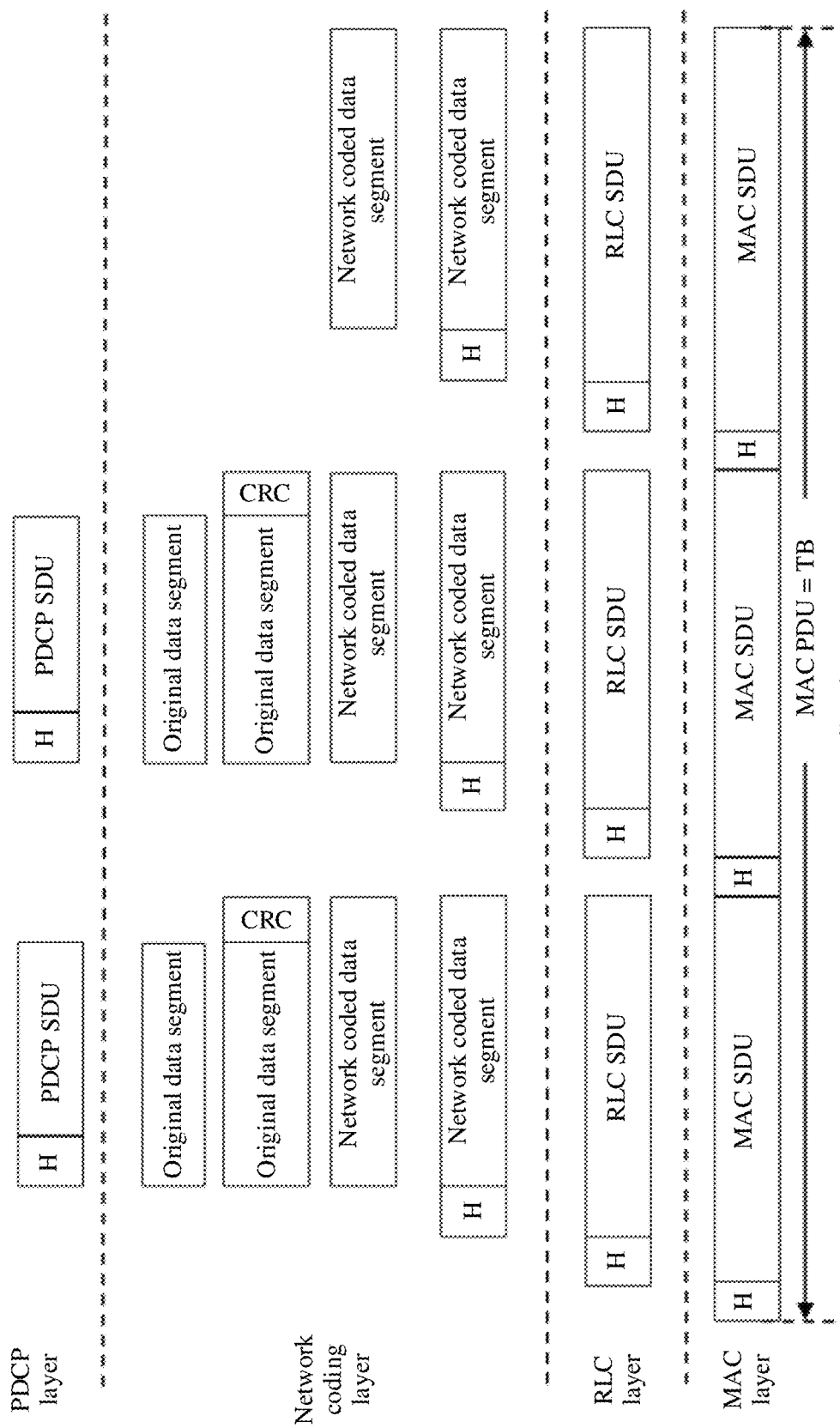
FIG. 10 is a schematic diagram of transmission of network coded data according to an embodiment of this application.

With reference to FIG. 10, the method shown in FIG. 8 is described in more detail. For ease of understanding, FIG. 8 is described by using an example in which a new protocol layer (a network coding layer) is added between a PDCP layer and an RLC layer, and the network coding layer has a network coding function. For ease of description, in an embodiment in FIG. 10, the first device is referred to as a transmit end, and the second device is referred to as a receive end. The third original data segment and the fourth original data segment are collectively referred to as an original data segment, the third network coded data segment and the fourth network coded data segment are collectively referred to as a network coded data segment, and the fifth CRC information and the sixth CRC information are collectively referred to as CRC information.

As shown in FIG. 10, a network coding layer of the transmit end receives a PDCP PDU sent by an upper layer PDCP. The network coding layer may use a plurality of PDCP PDUs as a group of code block, or may use one PDCP PDU as a group of code block, or select, according to a predefined rule or a semi-persistent configuration rule, a PDCP PDU of a corresponding size or length as a group of code block. The group of code block may include a non-integer quantity of PDCP PDUs. A bit sequence of the group of code block is segmented according to the predefined rule or the semi-persistent configuration rule, to obtain a plurality of original data segments. The rule may include information such as a total quantity of bits included in one group of code block, a quantity of original data segments included in one group of code block, and a size or a size limit of a quantity of bits of one original data segment. For example, the predefined rule is that a quantity of original data segments included in one group of code block is 2, and a quantity of bits of one original data segment is 500 bytes. If a size of the PDCP PDU received by the network coding layer is 1000 bytes, the PDCP PDU forms one group of code block, and the PDCP PDU is segmented to obtain two original data segments.

CRC information is added to each of the plurality of original data segments obtained through segmentation, and then network coding is performed on the plurality of original data segments to which the CRC information is added, to generate at least one network coded data segment. A network coding rule may be predefined or configured in a semi-persistent manner, and the network coding rule includes information such as a network coding scheme and a size of a network coding GF field. The network coding scheme may be random linear network coding, deterministic linear network coding, BATS code, erasure code, fountain code, convolutional network coding, streaming coding, or the like.

For example, the predefined network coding rule is the random linear network coding, and the size of the network coding GF field is configured as GF(4), and the two original data segments to which the CRC information is added are respectively $X_1$ and $X_2$. In this case, the random linear network coding is performed on the two original data segments, to generate three network coded data segments, where the three network coded data segments are respectively represented as $Y_1$, $Y_2$, $Y_3$, and $Y_1$, $Y_2$, $Y_3$ satisfy a formula $Y_i = \sum_{m=1}^{M} g_{i,m} \times X_m$. Optionally, coefficients $g_1$, $g_2$, $g_3$ that are randomly selected for generating the three network coded data segments may be $g_1=[1\ 0]$, $g_2=[2\ 3]$, and $g_3=[3\ 1]$ respectively.

A network coding layer PDU is generated based on the network coded data segment. For a plurality of forms of the PDU, refer to the descriptions in the foregoing embodiments. The generated network coding layer PDU is sent to a next layer, namely, the RLC layer. Finally, the network coded data segment is sent to the receive end by using a physical layer TB. It may be understood that network coded data segments of a same code block may be sent by using a single TB, or may be sent by using different TBs.

A physical layer of the receive end sends all received information bit sequences to an upper layer MAC layer. Optionally, regardless of whether a TB is correct, the MAC layer delivers an RLC PDU obtained through parsing to an upper layer, and the RLC layer delivers a network coding layer PDU obtained through parsing to a network coding layer. To be specific, the MAC layer may not perform CRC check on the TB, or the MAC layer performs CRC check on the TB, but delivers the PDU to the upper layer even if a TB error is found.

The network coding layer of the receive end receives all network coding layer PDUs sent by the network coding layer of the transmit end, where the network coding layer PDU includes a network coded data segment and a network coding parameter corresponding to the network coded data segment. The network coding layer of the receive end stores the network coding layer PDU in a corresponding reception buffer based on a code block ID indicated by the network coding parameter in each network coding layer PDU, and decodes all the network coded data segments in the same code block based on the corresponding network coding parameters, to obtain the original data segment including the CRC information. Further, CRC check is performed on the original data segment by using the CRC information, to obtain an original data segment for which the CRC check is correct.

The following continues to use the foregoing example of generating $Y_1$, $Y_2$, $Y_3$ by using the coefficients $g_1$, $g_2$, $g_3$ in a network coding process to describe a decoding process. The network coding layer of the receive end receives the network coded data segments $Y_1$, $Y_2$, $Y_3$ of the same code block sent by a bottom layer, and determines, based on network coding parameter indications respectively corresponding to the network coded data segments, a predefined network coding rule, or a configuration information indication, that the code block has two original data segments. Therefore, coding coefficient vectors $g_1$, $g_2$, and $g_3$ that are indicated in the network coding parameters and that respectively correspond to $Y_1$, $Y_2$, $Y_3$ are combined together to form a system of linear equations in two variables with respect to unknown numbers $X_1$, $X_2$, where the system of linear equations in two variables satisfies the following formula:

$$Y_1 = 1*X_1 + 0*X_2$$

$$Y_2 = 2*X_1 + 3*X_2$$

$$Y_3 = 3*X_1 + 1*X_2$$

A coefficient matrix of the system of equations satisfies the following matrix:

$$G = \begin{bmatrix} g_{1,1} & g_{1,1} \\ g_{2,1} & g_{2,2} \\ g_{3,1} & g_{3,2} \end{bmatrix} = \begin{bmatrix} 1 & 0 \\ 2 & 3 \\ 3 & 1 \end{bmatrix}$$

If $Y_1$, $Y_2$, $Y_3$ are all correctly transmitted, $Y_1$, $Y_2$, and $Y_3$ are decoded to obtain one group of $X_1$, $X_2$, and the CRC check is performed on each of $X_1$, $X_2$ to obtain a check result, where the check result indicates that the check is correct. A part of $Y_1$, $Y_2$, $Y_3$ may be incorrectly transmitted due to impact of a channel factor. In this case, at least one group of $X_1$, $X_2$ may be obtained by decoding $Y_1$, $Y_2$, and $Y_3$. The CRC check is performed on the obtained $X_1$, $X_2$, and $X_1$, $X_2$ for which the CRC check is correct are selected, to obtain an original data segment.

The method provided in embodiments of this application is described above in detail with reference to FIG. 2 to FIG. 10. An apparatus provided in embodiments of this application is described in detail below with reference to FIG. 11 to FIG. 14.

Figure 11:
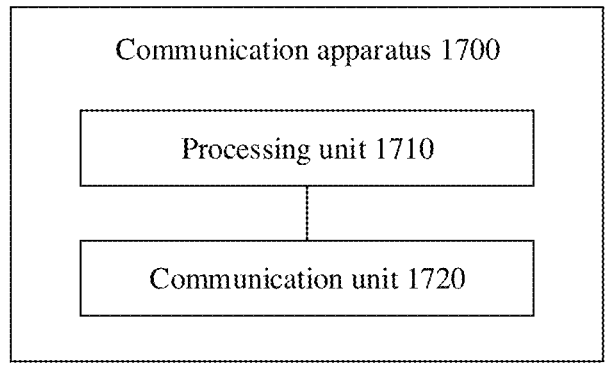
FIG. 11 is a schematic block diagram of a communication apparatus according to an embodiment of this application.

FIG. 11 is a schematic block diagram of a communication apparatus according to an embodiment of this application. As shown in FIG. 11, the communication apparatus 1700 may include a processing unit 1710 and a communication unit 1720. The processing unit 1710 and the communication unit 1720 may be software, hardware, or a combination of software and hardware.

The communication unit 1720 may include an input unit and/or an output unit. The output unit is configured to implement a data unit output function. The input unit is configured to implement a data unit input function. The communication unit 1720 may implement the input function and/or the output function. The communication unit 1720 may alternatively be described as an input/output unit.

Optionally, the communication unit 1720 may be configured to receive a data unit (or information) sent by another apparatus, and may be further configured to send a data unit (or information) to the another apparatus. The processing unit 1710 may be configured to perform internal processing of the apparatus.

In a possible design, the communication apparatus 1700 may correspond to the first device in the method embodiments in FIG. 2 to FIG. 7. The communication apparatus 1700 may be the first device, or may be a chip in the first device. The communication apparatus 1700 may include units configured to perform the operations performed by the first device in the method embodiments in FIG. 2 to FIG. 7, and the units in the communication apparatus 1700 are separately configured to implement the operations performed by the first device in the method embodiments in FIG. 2 to FIG. 7.

For example, the processing unit 1710 is configured to: perform network coding based on a first data segment, to obtain a first network coded data segment; and generate first cyclic redundancy check CRC information and a first data unit based on the first network coded data segment, where the first data unit includes a network coding parameter and the first CRC information that correspond to the first network coded data segment, and the first CRC information is for checking the first network coded data segment.

The communication unit 1720 is configured to output the first data unit.

Optionally, the processing unit 1710 is configured to generate the first CRC information based on the first network coded data segment and the network coding parameter.

Optionally, the first data segment includes a first original data segment; or the first data segment includes a first original data segment and second CRC information, and the second CRC information is for checking the first original data segment.

Optionally, the first data unit is a protocol data unit PDU, and the PDU includes a protocol header part, a network coded data part, and a check bit part.

The protocol header part includes the network coding parameter, the network coded data part includes the first network coded data segment, and the check bit part includes the first CRC information.

Optionally, the first data unit is a PDU, and the PDU includes a protocol header part, at least one network coded data part, at least one subheader part, and at least one check bit part.

The protocol header part includes quantity indication information, and the quantity indication information indicates a quantity of first network coded data segments included in the PDU.

One network coded data part includes one first network coded data segment, one subheader part includes a network coding parameter corresponding to the first network coded data segment, and one check bit part includes one piece of the first CRC information.

Optionally, the first data unit is a PDU, and the PDU includes a protocol header part, a data field part, and a check bit part.

The protocol header part includes length indication information, and the length indication information indicates a length of the data field part.

The data field part includes the network coding parameter and the first network coded data segment, and the check bit part includes the first CRC information.

Optionally, the first data unit is a PDU, and the PDU includes a protocol header part and a data field part.

The protocol header part includes length indication information, and the length indication information indicates a length of the data field part.

The data field part includes the network coding parameter, the first network coded data segment, and the first CRC information.

Optionally, the first data unit includes a code block header, a code block, and a check bit part, and the code block includes at least one first network coded data segment.

The check bit part includes the first CRC information corresponding to the code block.

The code block header includes a network coding parameter corresponding to one or more first network coded data segments in the at least one first network coded data segment.

Optionally, the processing unit 1710 is further configured to: generate the first CRC information based on the at least one first network coded data segment; or generate the first CRC information based on the at least one first network data segment and data included in the code block header.

Optionally, the network coding parameter includes one or more of the following parameters: identifier information of a code block corresponding to the first network coded data segment, coefficient indication information corresponding to the first network coded data segment, identifier information of the first network coded data segment in a corresponding code block, or a quantity of first data segments included in a code block corresponding to the first network coded data segment.

Optionally, the PDU is one of the following PDUs: a media access control MAC layer PDU, a radio link control RLC layer PDU, a backhaul adaptation protocol BAP layer PDU, a packet data convergence protocol PDCP layer PDU, or a PDU of a protocol layer having a network coding function.

In a possible design, the communication apparatus 1700 may correspond to the second device in the method embodiments in FIG. 2 to FIG. 7. For example, the communication apparatus 1700 may be the second device, or may be a chip in the second device. The communication apparatus 1700 may include units configured to perform the operations performed by the second device in the method embodiments in FIG. 2 to FIG. 7, and the units in the communication apparatus 1700 are separately configured to implement the operations performed by the second device in the method embodiments in FIG. 2 to FIG. 7.

For example, the communication unit 1720 is configured to obtain a second data unit, where the second data unit includes a second network coded data segment, a network coding parameter corresponding to the second network coded data segment, and third CRC information.

The processing unit 1710 is configured to: check the second network coded data segment by using the third CRC information; determine, based on a check result, that the second network coded data segment is correctly transmitted; and decode the second network coded data segment based on the network coding parameter.

Optionally, the processing unit 1710 is further configured to check the second network coded data segment and the network coding parameter by using the third CRC information; and determine, based on a check result, that the second network coded data segment and the network coding parameter are correctly transmitted.

Optionally, the processing unit 1710 is further configured to: decode the second network coded data segment based on the network coding parameter, to obtain a second data segment, where the second data segment includes fourth CRC information and a second original data segment; check the second original data segment by using the fourth CRC information; and determine, based on a check result, whether the second original data segment is correctly transmitted.

In a possible design, the communication apparatus 1700 may correspond to the first device in the method embodiments in FIG. 8 to FIG. 10. The communication apparatus 1700 may be the first device, or may be a chip in the first device. The communication apparatus 1700 may include units configured to perform the operations performed by the first device in the method embodiments in FIG. 8 to FIG. 10, and the units in the communication apparatus 1700 are separately configured to implement the operations performed by the first device in the method embodiments in FIG. 8 to FIG. 10.

For example, the processing unit 1710 is configured to: generate fifth CRC information based on a third original data segment; perform network coding based on the third original data segment and the fifth CRC information, to obtain a third network coded data segment; and generate a third data unit based on the third network coded data segment, where the third data unit includes a network coding parameter corresponding to the third network coded data segment.

The communication unit 1720 is configured to output the third data unit.

Optionally, the third data unit is a PDU, and the PDU includes a protocol header part and a network coded data part.

The protocol header part includes the network coding parameter, and the network coded data part includes the third network coded data segment.

Optionally, the third data unit is a PDU, and the PDU includes a protocol header part, at least one network coded data part, and at least one subheader part.

The protocol header part includes quantity indication information, and the quantity indication information indicates a quantity of third network coded data segments included in the PDU.

One network coded data part includes one third network coded data segment, and one subheader part includes a network coding parameter corresponding to the third network coded data segment.

Optionally, the third data unit is a PDU, and the PDU includes a protocol header part and a data field part.

The protocol header part includes length indication information, and the length indication information indicates a length of the data field part.

The data field part includes the third network coded data segment and the network coding parameter.

In a possible design, the communication apparatus 1700 may correspond to the second device in the method embodiments in FIG. 8 to FIG. 10. For example, the communication apparatus 1700 may be the second device, or may be a chip in the second device. The communication apparatus 1700 may include units configured to perform the operations performed by the second device in the method embodiments in FIG. 8 to FIG. 10, and the units in the communication apparatus 1700 are separately configured to implement the operations performed by the second device in the method embodiments in FIG. 8 to FIG. 10.

For example, the communication unit 1720 is configured to obtain a fourth data unit, where the fourth data unit includes a fourth network coded data segment and a network coding parameter corresponding to the fourth network coded data segment.

The processing unit 1710 is configured to: decode the fourth network coded data segment based on the network coding parameter, to obtain a fourth original data segment and sixth CRC information; check the fourth original data segment by using the sixth CRC information; and determine, based on a check result, whether the fourth original data segment is correctly transmitted.

Figure 12:
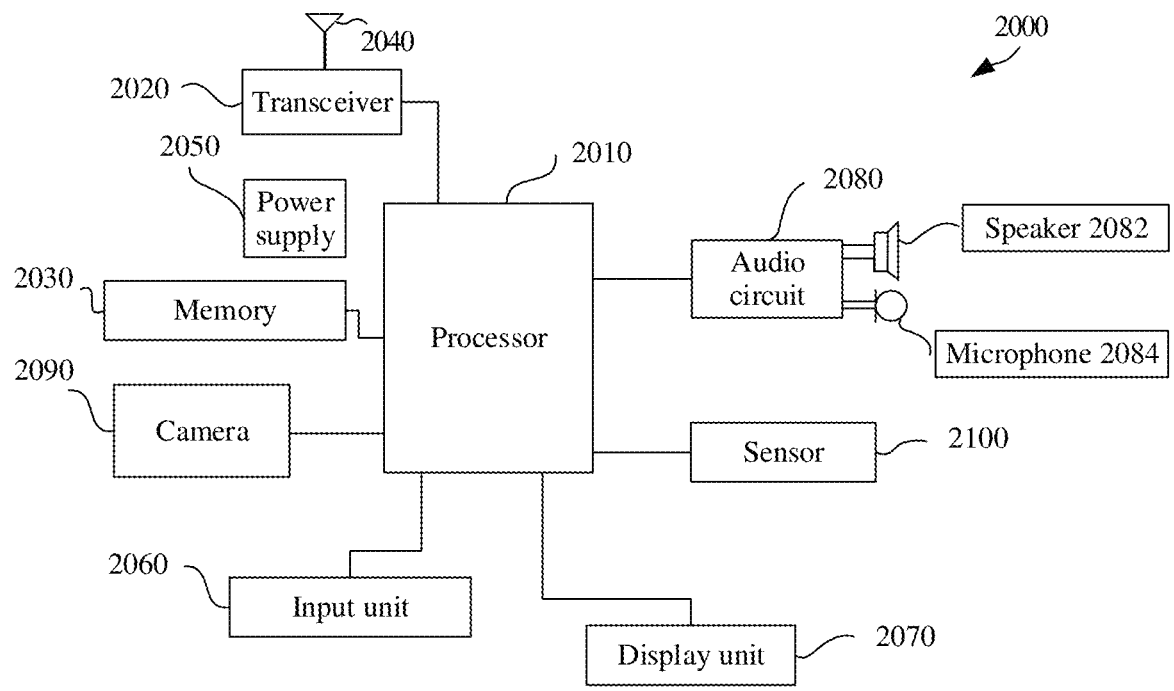
FIG. 12 is a schematic diagram of a structure of a terminal device according to an embodiment of this application.

It should be understood that, when the communication apparatus 1700 is a terminal device, the communication unit 1720 in the communication apparatus 1700 may correspond to a transceiver 2020 in a terminal device 2000 shown in FIG. 12, and the processing unit 1710 in the communication apparatus 1700 may correspond to a processor 2010 in the terminal device 2000 shown in FIG. 12.

It should be further understood that, when the communication apparatus 1700 is a chip configured in a UE, the communication unit 1720 in the communication apparatus 1700 may be an input/output interface.

Figure 13:
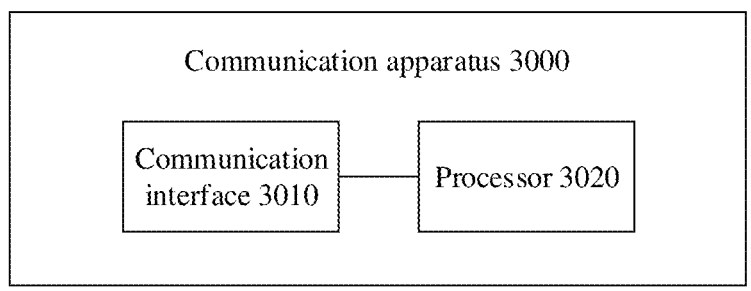
FIG. 13 is a schematic block diagram of another communication apparatus according to an embodiment of this application.

It should be understood that, when the communication apparatus 1700 corresponds to a session management network element, a mobility management network element, or another network element in a core network, the communication unit 1720 in the communication apparatus 1700 may correspond to a communication interface 3010 shown in FIG. 13, and the processing unit 1710 may correspond to a processor 3020 shown in FIG. 13.

FIG. 12 is a schematic diagram of a structure of a terminal device 2000 according to an embodiment of this application. The terminal device 2000 may be applied to the system shown in FIG. 1B, to perform functions of the terminal device (or UE) in the foregoing method embodiments. As shown in FIG. 12, the terminal device 2000 includes a processor 2010 and a transceiver 2020. Optionally, the terminal device 2000 further includes a memory 2030. The processor 2010, the transceiver 2002, and the memory 2030 may communicate with each other through an internal connection path, to transfer a control signal or a data signal. The memory 2030 is configured to store a computer program. The processor 2010 is configured to invoke the computer program from the memory 2030 and run the computer program, to control the transceiver 2020 to receive and send a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030 to implement the foregoing functions. During specific implementation, the memory 2030 may alternatively be integrated into the processor 2010, or may be independent of the processor 2010. The processor 2010 may correspond to the processing unit in FIG. 11.

The foregoing transceiver 2020 may correspond to the communication unit in FIG. 11. The transceiver 2020 may include a receiver (or referred to as a receiver circuit) and a transmitter (or referred to as a transmitter circuit). The receiver is configured to receive a signal, and the transmitter is configured to transmit a signal.

It should be understood that the terminal device 2000 shown in FIG. 12 can implement processes related to the first device or the second device according to any one of the foregoing method embodiments. Operations or functions of the modules in the terminal device 2000 are intended to implement corresponding processes in the foregoing method embodiments. For details, refer to the descriptions in the foregoing method embodiments. To avoid repetition, detailed descriptions are properly omitted herein.

The processor 2010 may be configured to perform an action implemented inside the first device or the second device described in the foregoing method embodiments, and the transceiver 2020 may be configured to perform an action of outputting or obtaining a data unit by the first device or the second device described in the foregoing method embodiments. For details, refer to the descriptions in the foregoing method embodiments.

Optionally, the terminal device 2000 may further include a power supply 2050, configured to supply power to various components or circuits in the terminal device.

In addition, to improve the functions of the terminal device, the terminal device 2000 may further include one or more of an input unit 2060, a display unit 2070, an audio circuit 2080, a camera 2090, a sensor 2100, and the like, and the audio circuit may further include a speaker 2082, a microphone 2084, and the like.

FIG. 13 is a schematic diagram of a structure of a communication apparatus according to an embodiment of this application. It should be understood that the communication apparatus 3000 shown in FIG. 13 is merely an example. The communication apparatus in embodiments of this application may further include other modules or units, or may include modules having functions similar to those of modules in FIG. 13, or may not necessarily include all modules in FIG. 13.

The communication apparatus 3000 includes a communication interface 3010 and at least one processor 3020.

The communication apparatus 3000 may correspond to any one of a session management network element, a mobility management network element, a terminal device, an access network device, and a network device. The at least one processor 3020 executes program instructions, so that the communication apparatus 3000 implements a corresponding procedure of the method performed by the first device or the second device in the foregoing method embodiments.

Optionally, the communication apparatus 3000 may further include a memory. The memory may store the program instructions, and the at least one processor 3020 may read the program instructions stored in the memory, and execute the program instructions.

Figure 14:
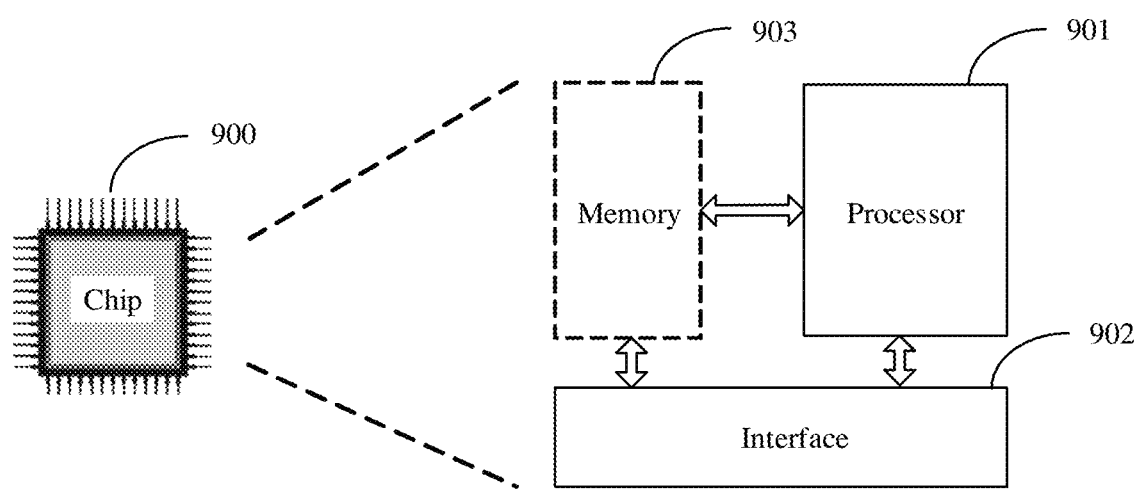
FIG. 14 is a schematic diagram of a structure of a chip according to an embodiment of this application.

For a case in which the communication apparatus may be a chip or a chip system, refer to a schematic diagram of a structure of a chip shown in FIG. 14. The chip 900 shown in FIG. 14 includes a processor 901 and an interface 902. There may be one or more processors 901 and a plurality of interfaces 902. It should be noted that a function corresponding to each of the processor 901 and the interface 902 may be implemented by using a hardware design, or may be implemented by using a software design, or may be implemented by combining software and hardware. This is not limited herein.

In a possible design, when the chip is configured to: implement a function of the first device in embodiments of this application, the processor 901 is configured to: perform network coding based on a first data segment, to obtain a first network coded data segment; and generate first cyclic redundancy check CRC information and a first data unit based on the first network coded data segment, where the first data unit includes a network coding parameter and the first CRC information that correspond to the first network coded data segment, and the first CRC information is for checking the first network coded data segment.

The interface 902 is configured to output the first data unit.

Optionally, the chip further includes a memory 903, and the memory 903 is configured to store program instructions and data that are necessary for the first device.

When the chip is configured to implement a function of the second device in embodiments of this application, the interface 902 is configured to obtain a second data unit, where the second data unit includes a second network coded data segment, a network coding parameter corresponding to the second network coded data segment, and third CRC information.

The processor 901 is configured to: check the second network coded data segment by using the third CRC information; determine, based on a check result, that the second network coded data segment is correctly transmitted; and decode the second network coded data segment based on the network coding parameter.

Optionally, the chip further includes a memory 903, and the memory 903 is configured to store program instructions and data that are necessary for the second device.

The processor in embodiments of this application may be a central processing unit (CPU), or may be another general-purpose processor, a digital signal processor (DSP), an application-specific integrated circuit (ASIC), a field programmable gate array (FPGA), another programmable logic device, a discrete gate or transistor logic device, a discrete hardware component, or the like. The general-purpose processor may be a microprocessor, or the processor may be any conventional processor or the like.

According to the method provided in embodiments of this application, this application further provides a computer program product. The computer program product includes computer program code. When the computer program code is run on a computer, the computer is enabled to perform the method on the first device side or the method on the second device side according to any one of the foregoing method embodiments.

In another embodiment of this application, a communication system is further provided. The communication system includes a first device and a second device. For example, the first device may be the first device provided in FIG. 2 to FIG. 7 or FIG. 8 to FIG. 10, and is configured to perform the steps of the first device in the data transmission method provided in FIG. 2 to FIG. 7 or FIG. 8 to FIG. 10; and/or the second device may be the second device provided in FIG. 2 to FIG. 7 or FIG. 8 to FIG. 10, and is configured to perform the steps of the second device in the data transmission method provided in FIG. 2 to FIG. 7 or FIG. 8 to FIG. 10.

An embodiment of this application further provides a processing apparatus, including a processor and an interface. The processor is configured to perform the method according to any one of the foregoing method embodiments.

It should be understood that the processing apparatus may be a chip. For example, the processing apparatus may be a field programmable gate array (FPGA), a general-purpose processor, a digital signal processor (DSP), an application-specific integrated circuit (ASIC), another programmable logic device, a discrete gate or transistor logic device, a discrete hardware component, a system on chip (SoC), a central processing unit (CPU), a network processor (NP), a digital signal processing circuit (DSP), a micro controller unit (MCU), a programmable controller (programmable logic device, PLD), or another integrated chip. The processing apparatus may implement or perform the methods, the steps, and logic block diagrams that are disclosed in embodiments of this application. The general-purpose processor may be a microprocessor, or the processor may be any conventional processor or the like. The steps of the methods disclosed with reference to embodiments of this application may be directly executed and accomplished by using a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in embodiments of this application may be a transitory memory or a non-transitory memory, or may include a transitory memory and a non-transitory memory. The non-transitory memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The transitory memory may be a random access memory (RAM), and is used as an external cache. By way of example but not limitation, a plurality of forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the system and the method described in this specification is intended to include but is not limited to these memories and any memory of another proper type.

All or a part of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk drive, or a magnetic tape), an optical medium (for example, a high-density digital video disc (digital video disc, DVD)), a semiconductor medium (for example, a solid-state drive (SSD)), or the like.

The first device and the second device in the foregoing apparatus embodiments exactly correspond to the first device and the second device in the method embodiments. A corresponding module or unit performs a corresponding step. For example, a communication unit (a transceiver) performs a receiving step or a sending step in the method embodiments, and a step other than the sending step and the receiving step may be performed by a processing unit (a processor). For a function of a specific unit, refer to a corresponding method embodiment. There may be one or more processors.

Terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, an execution thread, a program, or a computer. As illustrated by using figures, both a computing device and an application that runs on the computing device may be components. One or more components may reside within a process or an execution thread, and a component may be located on one computer or distributed between two or more computers. In addition, these components may be executed from various computer-readable media that store various data structures. For example, the components may communicate by using a local or remote process based on a signal having one or more data packets (for example, data from two components interacting with another component in a local system, in a distributed system, or across a network such as the Internet interacting with another system by using the signal).

It should be understood that, an "embodiment" mentioned throughout this specification means that particular features, structures, or characteristics related to this embodiment are included in at least one embodiment of this application. Therefore, embodiments in the entire specification do not necessarily refer to a same embodiment. In addition, these particular features, structures, or characteristics may be combined in one or more embodiments in any appropriate manner.

It should be understood that, in embodiments of this application, numbers "first", "second", and the like are merely used to distinguish between different objects, for example, to distinguish between different network devices, and do not constitute any limitation on the scope of embodiments of this application. Embodiments of this application are not limited thereto.

It should be further understood that, in this application, both "when" and "if" mean that a network element performs corresponding processing in an objective situation, but do not constitute any limitation on time, do not require the network element to perform a determining action during implementation, and do not mean other limitations either.

It should be further understood that in embodiments of this application, "B corresponding to A" indicates that B is associated with A, and B may be determined based on A. However, it should further be understood that determining B based on A does not mean that B is determined based on A only. In other words, B may alternatively be determined based on A and/or other information.

It should be further understood that the term "and/or" in this specification describes only an association relationship between associated objects and represents that three relationships may exist. For example, A and/or B may represent the following three cases: Only A exists, both A and B exist, and only B exists. In addition, the character "/" in this specification usually indicates an "or" relationship between the associated objects.

Unless otherwise specified, an expression in this application similar to an expression "an item includes one or more of the following: A, B, and C" usually means that the item may be any one of the following: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. In the foregoing descriptions, three elements A, B, and C are used as an example to describe an optional case of the item. When an expression is "the item includes at least one of the following: A, B, . . . , and X", in other words, when more elements are included in the expression, a case to which the item is applicable may also be obtained according to the foregoing rule.

It may be understood that, in embodiments of this application, the first device and/or the second device may perform some or all steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application may be necessarily performed.

A person of ordinary skill in the art may be aware that, units and algorithm steps described with reference to embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments.

In the several embodiments provided in this application, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for indicating a computer device (which may be a personal computer, a server, or a network device) to perform all or some of the steps of the methods described in embodiments of this application. The foregoing storage medium includes any medium that can store program code, such as a USB flash drive, a removable hard disk drive, a read-only memory ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
  performing network coding based on a first data segment, to obtain a first network coded data segment;
  generating first cyclic redundancy check (CRC) information and a first data unit based on the first network coded data segment, wherein the first data unit comprises a network coding parameter and the first CRC information, the network coding parameter corresponds to the first network coded data segment, and the first CRC information is error check information for the first network coded data segment, wherein the network coding parameter comprises coefficient indication information corresponding to the first network coded data segment, and the coefficient indication information comprises a coding coefficient vector corresponding to the first network coded data segment, or index information that indicates a corresponding coding coefficient vector; and outputting the first data unit, wherein the first data unit is a protocol data unit (PDU), and the PDU comprises a protocol header part, at least one network coded data part, at least one subheader part, and at least one check bit part;

the protocol header part comprises quantity indication information, and the quantity indication information indicates a quantity of first network coded data segments comprised in the PDU; and one of the at least one network coded data part comprises one first network coded data segment, one of the at least one subheader part comprises a network coding parameter corresponding to the one first network coded data segment, and one of the at least one check bit part comprises one piece of the first CRC information.

2. The method according to claim 1, wherein the generating first CRC information based on the first network coded data segment comprises:

generating the first CRC information based on the first network coded data segment and the network coding parameter.

3. The method according to claim 1, wherein the first data segment comprises a first original data segment; or the first data segment comprises a first original data segment and second CRC information, and the second CRC information is error check information for the first original data segment.

4. An apparatus, comprising:

one or more processors; and a memory having instructions stored thereon that, when executed by the one or more processors, cause the apparatus to perform operations comprising:

performing network coding based on a first data segment, to obtain a first network coded data segment;

generating first cyclic redundancy check (CRC) information and a first data unit based on the first network coded data segment, wherein the first data unit comprises a network coding parameter and the first CRC information, the network coding parameter corresponds to the first network coded data segment, and the first CRC information is error check information for the first network coded data segment, wherein the network coding parameter comprises coefficient indication information corresponding to the first network coded data segment, and the coefficient indication information comprises a coding coefficient vector corresponding to the first network coded data segment, or index information that indicates a corresponding coding coefficient vector; and outputting the first data unit, wherein the first data unit is a protocol data unit (PDU), and the PDU comprises a protocol header part, at least one network coded data part, at least one subheader part, and at least one check bit part;

the protocol header part comprises quantity indication information, and the quantity indication information indicates a quantity of first network coded data segments comprised in the PDU; and one of the at least one network coded data part comprises one first network coded data segment, one of the at least one subheader part comprises a network coding parameter corresponding to the one first network coded data segment, and one of the at least one check bit part comprises one piece of the first CRC information.

5. The apparatus according to claim 4, wherein the generating the first CRC information based on the first network coded data segment comprises:

generating the first CRC information based on the first network coded data segment and the network coding parameter.

6. The apparatus according to claim 4, wherein the first data segment comprises a first original data segment; or the first data segment comprises a first original data segment and second CRC information, and the second CRC information is error check information for the first original data segment.

7. A non-transitory computer readable medium storing instructions that, when executed by one or more processors, causes the one or more processors to perform operations comprising:

performing network coding based on a first data segment, to obtain a first network coded data segment;

generating first cyclic redundancy check (CRC) information and a first data unit based on the first network coded data segment, wherein the first data unit comprises a network coding parameter and the first CRC information, the network coding parameter corresponds to the first network coded data segment, and the first CRC information is error check information for the first network coded data segment, wherein the network coding parameter comprises coefficient indication information corresponding to the first network coded data segment, and the coefficient indication information comprises a coding coefficient vector corresponding to the first network coded data segment, or index information that indicates a corresponding coding coefficient vector; and outputting the first data unit, wherein the first data unit is a protocol data unit (PDU), and the PDU comprises a protocol header part, at least one network coded data part, at least one subheader part, and at least one check bit part;

the protocol header part comprises quantity indication information, and the quantity indication information indicates a quantity of first network coded data segments comprised in the PDU; and one of the at least one network coded data part comprises one first network coded data segment, one of the at least one subheader part comprises a network coding parameter corresponding to the first network coded data segment, and one of the at least one check bit part comprises one piece of the first CRC information.

8. The non-transitory computer readable medium according to claim 7, wherein the generating first CRC information based on the first network coded data segment comprises:

generating the first CRC information based on the first network coded data segment and the network coding parameter.

9. The non-transitory computer readable medium according to claim 7, wherein the first data segment comprises a first original data segment; or the first data segment comprises a first original data segment and second CRC information, and the second CRC information is error check information for the first original data segment.

* * * * *